United States Patent
Sasaki et al.

(10) Patent No.: US 11,274,248 B2
(45) Date of Patent: Mar. 15, 2022

(54) LANTHANOID-CONTAINING INORGANIC MATERIAL MICROPARTICLES, WAVELENGTH-CONVERTING INK, COATED ARTICLE, AND DETERMINATION APPARATUS

(71) Applicant: SEKISUI CHEMICAL CO., LTD., Osaka (JP)

(72) Inventors: Taku Sasaki, Osaka (JP); Takeshi Wakiya, Osaka (JP); Kenji Oohashi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 817 days.

(21) Appl. No.: 16/070,551

(22) PCT Filed: Jan. 24, 2017

(86) PCT No.: PCT/JP2017/002293
§ 371 (c)(1),
(2) Date: Jul. 17, 2018

(87) PCT Pub. No.: WO2017/130943
PCT Pub. Date: Aug. 3, 2017

(65) Prior Publication Data
US 2021/0054271 A1   Feb. 25, 2021

(30) Foreign Application Priority Data

| Jan. 28, 2016 | (JP) | JP2016-014541 |
| Jan. 28, 2016 | (JP) | JP2016-014542 |
| Mar. 22, 2016 | (JP) | JP2016-057390 |
| Mar. 22, 2016 | (JP) | JP2016-057391 |
| May 25, 2016 | (JP) | JP2016-104520 |
| May 25, 2016 | (JP) | JP2016-104521 |

(51) Int. Cl.
| C09K 11/77 | (2006.01) |
| B41M 3/14 | (2006.01) |
| C09D 11/037 | (2014.01) |
| C09D 11/322 | (2014.01) |
| C09K 11/02 | (2006.01) |
| C09D 5/22 | (2006.01) |
| B82Y 20/00 | (2011.01) |
| B82Y 40/00 | (2011.01) |

(52) U.S. Cl.
CPC .......... *C09K 11/7705* (2013.01); *B41M 3/14* (2013.01); *C09D 5/22* (2013.01); *C09D 11/037* (2013.01); *C09D 11/322* (2013.01); *C09K 11/025* (2013.01); *B82Y 20/00* (2013.01); *B82Y 40/00* (2013.01)

(58) Field of Classification Search
CPC .... C09K 11/7705; C09K 11/025; C09D 5/22; C09D 11/037; C09D 11/322; B41M 3/14
See application file for complete search history.

(56) References Cited

U.S. PATENT DOCUMENTS

| 2005/0136486 A1* | 6/2005 | Haushalter | G01N 33/588 435/7.2 |
| 2008/0199381 A1 | 8/2008 | Tokumitsu | |
| 2014/0261031 A1* | 9/2014 | Kellar | B42D 25/382 101/211 |
| 2015/0136229 A1 | 5/2015 | Suto | |
| 2015/0353821 A1 | 12/2015 | Zhang et al. | |
| 2015/0362432 A1* | 12/2015 | Han | C09K 11/7773 435/4 |

FOREIGN PATENT DOCUMENTS

| CN | 101395247 | 3/2009 |
| JP | 2015-178602 | 10/2015 |
| JP | 2016-132685 | 7/2016 |
| WO | 2006/101015 | 9/2006 |
| WO | 2007/078262 | 7/2007 |
| WO | 2013/040464 | 3/2013 |
| WO | 2014/016893 | 1/2014 |
| WO | 2014/165516 | 10/2014 |
| WO | WO 2017/074260 | * 5/2017 |

OTHER PUBLICATIONS

Extended European Search Report dated Jul. 16, 2019 in corresponding European Patent Application No. 17744173.0.

Luoshan el al. "Surface plasmon resonance enhanced multi-shell-modified upconversion $NaYF_4$:$Yb^{3+}$, $Er^{3+}$@$siO_2$@$AuTiO_2$ crystallites for dye-sensitized solar cells", Journal of Power Sources, 2016, vol. 307, pp. 468-473.

Yi et al., "Water-Soluble $NaYF_4$:Yb,Er(Tm)/$NaYF_4$/Polymer Core/Shell/Shell Nanoparticles with Significant Enhancement of Upconversion Fluorescence", Chem. Mater. 19(3): 341-343 (2007).

(Continued)

*Primary Examiner* — C Melissa Koslow

(74) *Attorney, Agent, or Firm* — Wenderoth, Lind & Ponack, L.L.P.

(57) ABSTRACT

A lanthanoid-containing inorganic material fine particle having a function of converting a wavelength of light to a shorter wavelength, the lanthanoid-containing inorganic material fine particle including: a core particle; and a shell layer, the core particle containing a lanthanoid having a light-absorbing function and a lanthanoid having a light-emitting function, the shell layer including at least an outer shell containing a rare earth element, the total amount of the lanthanoid having a light-absorbing function and the lanthanoid having a light-emitting function in the outer shell being 2 mol % or less based on the amount of the rare earth element contained in the outer shell, the outer shell having a thickness of 2 to 20 nm, the core particle and the shell layer having no interface at a contact face to form a continuous body.

13 Claims, 4 Drawing Sheets

(56) References Cited

OTHER PUBLICATIONS

Liu et al., "Coupling effects of Au-decorated core-shell β-NaYF$_4$:Er/Yb@SiO$_2$ microprisms in dye-sensitized solar cells: plasmon resonance versus upconversion", Electrochimica Acta, 180: 3 94-400 (2015).
Ding et al., "Plasmonic enhanced upconversion luminescence of β-NaYF$_4$: Yb$^{3+}$/Er$^{3+}$ with Ag@SiO$_2$ core-shell nanopaticles", Journal of Luminescence, 147: 72-76 (2014).
International Search Report dated Feb. 28, 2017 in International (PCT) Application No. PCT/JP2017/002293.

* cited by examiner

LANTHANOID-CONTAINING INORGANIC MATERIAL MICROPARTICLES, WAVELENGTH-CONVERTING INK, COATED ARTICLE, AND DETERMINATION APPARATUS

TECHNICAL FIELD

The present invention relates to a lanthanoid-containing inorganic material fine particle that enables achievement of high luminous efficiency with less energy outflow upon conversion of the wavelength of light to a shorter wavelength. The present invention also relates to a wavelength conversion ink capable of maintaining high emission intensity at the time of wavelength conversion for a long period of time, having high water repellency, and capable of forming a printing pattern excellent in retention properties, a coated article produced using the wavelength conversion ink, and a determination apparatus.

BACKGROUND ART

Inorganic fine particles having an "up-conversion" function of converting long-wavelength light (e.g., infrared rays) to short-wavelength light (e.g., visible light, ultraviolet light) are expected to be applied for medical use such as biomarkers. Recently, highly functional materials to which an up-conversion function is imparted by dispersing such inorganic fine particles in a matrix material have been drawing attention.

Inorganic fine particles mainly containing lanthanoid elements are known as inorganic fine particles having an up-conversion function. These inorganic fine particles utilize a phenomenon called "multiphoton excitation" caused by the energy level difference of these elements.

A host material of such inorganic fine particles having an up-conversion function is desired to be a material having a low phonon energy and high chemical stability so as not to inhibit the process of light absorption, energy transfer, and light emission by the lanthanoid elements. Known examples of the material include oxide materials and fluoride materials.

In the case where the inorganic fine particles having an up-conversion function are nanoparticles, however, the inorganic fine particles have a large specific surface area and high surface free energy to cause outflow of energy from the surfaces of the fine particles upon energy transfer from the element having a light-absorbing function to the element having a light-emitting function, lowering the efficiency.

To address the situation, non-Patent Literature 1 proposes formation of a shell on the surface of an inorganic fine particle to prevent energy leakage.

However, in the case of the inorganic fine particle having a shell disclosed in non-Patent Literature 1, formation of a uniform shell unintendedly makes a shell layer thick, resulting in light scattering or absorption to cause loss of incident light or emitted light. In addition, in the case where the inorganic fine particle is a nanoparticle, the inorganic fine particle has a large specific surface area to be susceptible to oxidation or the like. Accordingly, a core particle with a poorly protected surface may result in a core-shell particle including a core particle with a surface contaminated by oxidation or the like upon formation of a shell. As a result, energy outflow from the contaminated part at the interface occurs.

CITATION LIST

Non-Patent Literature

Non-Patent Literature 1: Guang-Shun Yi and Gan-Moog Chow, Water-Soluble NaYF4:Tb,Er(Tm)/NaYF4/Polymer/Core/Shell/Shell Nanoparticles with Significant Enhancement of Upconversion Fluorescence, Chem Mater. 2007, 19, 341-343.

SUMMARY OF INVENTION

Technical Problem

In addition to the method of suppressing energy outflow, a method utilizing another principle that amplifies light has been also tried to increase the emission intensity. In particular, amplification of light emission by complexing a noble metal nanomaterial that expresses surface plasmon resonance (SPR) is drawing attention. In such a method, SPR is expressed, for example, by direct coating of the surface of a particle with colloidal gold or the like or by heteroaggregation after coating of a particle with an adsorption layer that adsorbs colloidal gold.

However, employment of the direct coating or heteroaggregation may cause a failure in uniform coating of a noble metal nanomaterial, unfortunately leading to aggregation that inhibits expression of SPR or detachment of colloidal gold coating during use.

Also proposed is an infrared fluorescent ink that contains inorganic fine particles having an up-conversion function, as a highly functional material having an up-conversion function, to react with infrared rays to emit visible light. Since such an infrared fluorescent ink is transparent under visible light, a printed material can contain second information, in addition to information recognizable under visible light. Accordingly, such infrared fluorescent ink is used for security purpose such as prevention of counterfeiting or information leak. Conventional UV fluorescent ink unfortunately causes deterioration of a print substrate due to UV irradiation. In the case of an infrared fluorescent ink, use of infrared rays can advantageously suppress such deterioration of a print substrate.

However, since inorganic fine particles having an up-conversion function have poor water resistance, the inorganic fine particles used in an infrared fluorescent ink may be deteriorated by environmental moisture. As a result, luminescence behavior may be changed with time or the inorganic particles may be dissolved in moisture upon contact of the print substrate with the moisture so that the printing pattern is deformed.

The present invention aims to provide a lanthanoid-containing inorganic material fine particle that enables achievement of high luminous efficiency with less energy outflow upon conversion of the wavelength of light to a shorter wavelength. The present invention also aims to provide a wavelength conversion ink capable of maintaining a high emission intensity at the time of wavelength conversion for a long period of time, having high water repellency, and capable of forming a printing pattern excellent in retention properties, a coated article produced using the wavelength conversion ink, and a determination apparatus.

Solution to Problem

The present invention provides a lanthanoid-containing inorganic material fine particle having a function of converting a wavelength of light to a shorter wavelength, the lanthanoid-containing inorganic material fine particle including: a core particle; and a shell layer, the core particle containing a lanthanoid having a light-absorbing function and a lanthanoid having a light-emitting function, the shell layer including at least an outer shell containing a rare earth element, the total amount of the lanthanoid having a light-absorbing function and the lanthanoid having a light-emitting function in the outer shell being 2 mol % or less based on the amount of the rare earth element contained in the outer shell, the outer shell having a thickness of 2 to 20 nm, the core particle and the shell layer having no interface at a contact face to form a continuous body.

The present invention is specifically described in the following.

As a result of intensive studies, the present inventors found that a core-shell particle that includes a layer protecting a surface and is produced by continuous growth of a core particle and a shell layer suffers less energy loss because contamination of the core particle or the shell layer is prevented. They also found that the function of preventing energy outflow and the light-absorbing function can be achieved at the same time by setting the thickness of the shell layer within a predetermined range. The present invention was thus completed.

The lanthanoid-containing inorganic material fine particle of the present invention has a core particle containing a lanthanoid having a light-absorbing function and a lanthanoid having a light-emitting function.

Because of the presence of the lanthanoid having a light-absorbing function and the lanthanoid having a light-emitting function therein, the lanthanoid-containing inorganic material fine particle can exhibit the "up-conversion function" of absorbing long-wavelength light such as infrared rays and converting the energy of the absorbed light to short-wavelength light such as visible light or ultraviolet light.

The lanthanoid having a light-absorbing function included in the core particle is not particularly limited as long as it is a lanthanoid capable of absorbing long-wavelength light such as infrared rays. Examples thereof include ytterbium (Yb) and neodymium (Nd). In particular, in the case where near infrared light is used as light to be absorbed, ytterbium is preferred because it shows high absorption at around 10,000 $cm^{-1}$. These lanthanoids may be used alone or in combination of two or more of these.

The lanthanoid having a light-emitting function included in the core particle is not particularly limited as long as it is a lanthanoid capable of emitting light upon excitation by energy from the lanthanoid having a light-absorbing function. Examples thereof include erbium (Er), holmium (Ho), and thulium (Tm). In particular, preferred are erbium, holmium, and thulium which emit light having a wavelength within a visible light range or ultraviolet light range. These lanthanoids may be used alone or in combination of two or more of these.

A combination of the lanthanoid having a light-absorbing function and the lanthanoid having a light-emitting function included in the core particle is not particularly limited. In the case of absorbing long-wavelength light such as infrared rays and converting the absorbed light to short-wavelength light such as visible light or ultraviolet light, preferred is a combination of ytterbium which shows high absorption at around 10,000 $cm^{-1}$ and at least one selected from erbium, holmium, and thulium which emit, in reaction to energy transfer from ytterbium, light having a wavelength within a visible light range or ultraviolet light range.

The core particle is not particularly limited as long as it contains the lanthanoid having a light-absorbing function and the lanthanoid having a light-emitting function. Examples thereof include those containing oxides, halides, or the like of the lanthanoid having a light-absorbing function and the lanthanoid having a light-emitting function. The halides are preferably fluorides.

The core particle preferably also contains an element having a similar ionic radius or a similar structure upon crystallization to that of the lanthanoids having a light-absorbing function and the lanthanoid having a light-emitting function, or a compound thereof. Examples of the element having a similar ionic radius or a similar structure upon crystallization to that of the lanthanoid having a light-absorbing function and the lanthanoid having a light-emitting function include rare earth elements other than the lanthanoids. Examples of the compound thereof include oxides and halides of rare earth elements other than the lanthanoids. The halides are preferably fluorides. Preferred is a fluoride containing an alkali metal and a rare earth element or a fluoride containing oxygen, an alkali metal, and a rare earth element.

Examples of the rare earth element other than the lanthanoids include yttrium (Y), gadolinium (Gd), and scandium (Sc). Examples of the compounds of a rare earth element other than the lanthanoids include oxides or halides of yttrium, gadolinium, and scandium.

In particular, the core particle preferably contains yttrium, an oxide of yttrium, or a halide of yttrium because high efficiency for the energy transfer between lanthanoids and resulting enhancement of the luminous efficiency can be expected. The oxide of yttrium is preferably $Y_2O_3$ and the halide of yttrium is preferably $NaYF_4$.

The core particle preferably contains $Y_2O_3$ or $NaYF_4$ as the compound of an element having a similar ionic radius or a similar structure upon crystallization to that of the lanthanoid having a light-absorbing function and the lanthanoid having a light-emitting function; ytterbium as the lanthanoid having a light-absorbing function; and at least one selected from the group consisting of erbium, holmium, and thulium as the lanthanoid having a light-emitting function.

The lower limit of the amount of the lanthanoid having a light-absorbing function in the core particle is preferably 2 mol %, more preferably 2.5 mol %, while the upper limit thereof is preferably 50 mol %, more preferably 25 mol %, based on the total amount of the lanthanoids and the element having a similar ionic radius or a similar structure upon crystallization to that of the lanthanoids contained in the core particle. When the amount of the lanthanoid having a light-absorbing function is equal to or more than the preferable lower limit and equal to or less than the preferable upper limit, the energy of light reaching the core particle can be efficiently absorbed.

The amount of the lanthanoid included in the core particle can be measured by using, for example a fluorescence X-ray analyzer (EDX-800HS available from Shimadzu Corporation).

The lower limit of the amount of the lanthanoid having a light-emitting function in the core particle is preferably 0.005 mol %, more preferably 0.01 mol %, while the upper limit thereof is preferably 20 mol %, more preferably 10 mol %, based on the total amount of the lanthanoids and the element having a similar ionic radius or a similar structure upon crystallization to that of the lanthanoids contained in the core particle. When the amount of the lanthanoid having a light-emitting function is equal to or more than the preferable lower limit and equal to or less than the preferable upper limit, the light-emitting function can be efficiently exhibited upon receipt of the absorbed energy.

The lower limit of the total amount of the lanthanoid having a light-absorbing function and the lanthanoid having a light-emitting function in the core particle is preferably 2 mol %, more preferably 2.5 mol %, while the upper limit thereof is preferably 50 mol %, more preferably 25 mol %, based on the total amount of the lanthanoids and the element having a similar ionic radius or a similar structure upon crystallization to that of the lanthanoids contained in the core particle. When the total amount of the lanthanoids included in the core particle is equal to or more than the preferable lower limit and equal to or less than the preferable upper limit, substitution and doping of the lanthanoids in the core particle can be performed without collapse of the crystal structure constituted by the element having a similar ionic radius or a similar structure upon crystallization to that of the lanthanoids. As a result, the efficiency of the energy transfer in the lanthanoid-containing inorganic material fine particle can be maintained without being lowered.

In the core particle, the lower limit of the molar ratio between the amount of the lanthanoid having a light-absorbing function and the amount of the lanthanoid having a light-emitting function (amount of the lanthanoid having a light-absorbing function/amount of the lanthanoid having a light-emitting function) is preferably 2, more preferably 5, while the upper limit thereof is preferably 100, more preferably 75.

When the ratio is equal to or more than the preferable lower limit and equal to or less than the preferable upper limit, the energy absorbed by the lanthanoid having a light-absorbing function can be uniformly transferred to the lanthanoid having a light-emitting function without excess or deficiency, leading to improvement of the efficiency of the wavelength-conversion function to be obtained.

The lower limit of the amount of the element having a similar ionic radius or a similar structure upon crystallization to that of the lanthanoids is preferably 5 mol %, more preferably 10 mol %, while the upper limit thereof is preferably 98 mol %, more preferably 80 mol %, based on the total amount of the rare earth elements contained in the core particle. When the amount of the element having a similar ionic radius or a similar structure upon crystallization to that of the lanthanoids is equal to or more than the preferable lower limit and equal to or less than the preferable upper limit, the element can form a regularly arranged crystal structure as a host material to be doped with the lanthanoid, thereby improving the efficiency of the energy transfer in the lanthanoid-containing inorganic material fine particle. As a result, the luminous efficiency is improved.

The amount of the element having a similar ionic radius or a similar structure upon crystallization to that of the lanthanoids included in the core particle can be measured by using, for example, a fluorescence X-ray analyzer (EDX-800HS available from Shimadzu Corporation).

The lower limit of the average particle size of the core particle is preferably 5 nm, more preferably 7.5 nm, while the upper limit thereof is preferably 250 nm, more preferably 200 nm. When the average particle size of the core particle is equal to or larger than the preferable lower limit and equal to or smaller than the preferable upper limit, the dispersibility and optical transparency can be both achieved in the case where the lanthanoid-containing inorganic material fine particle is made into a composite with another material (e.g., transparent plastics) to be used as an optical material. The average particle size of the core particle can be obtained by measuring the particle size of the core particle using an electron microscope.

The lanthanoid-containing inorganic material fine particle of the present invention further has a shell layer.

With the presence of the shell layer, leakage of energy of light absorbed by the core particle can be prevented.

The shell layer as used herein refers to a structure that is formed on the surface of the core particle and has a lanthanoid content different from that of the core particle.

The shell layer has at least an outer shell. In the present invention, the shell layer may consist of the outer shell alone or further include an inner shell between the outer shell and the core particle. In the case where the shell layer consists of the outer shell alone in the present invention, the shell layer includes a single layer of the outer shell and the composition of the outer shell is the same as that of the shell layer.

The outer shell refers to a structure having a lanthanoid content different from that of the core particle.

The outer shell included in the shell layer preferably contains an element having a similar ionic radius or a similar structure upon crystallization to that of the lanthanoids contained in the core particle, or a compound thereof. Examples of the element having a similar ionic radius or a similar structure upon crystallization to that of the lanthanoids and the compound thereof include those exemplified for the element having a similar ionic radius or a similar structure upon crystallization to that of the lanthanoids and the compound thereof included in the core particle.

In the outer shell, the upper limit of the total amount of the lanthanoid having a light-absorbing function and the lanthanoid having a light-emitting function contained in the outer shell is 2 mol % based on the total amount of the rare earth elements contained in the outer shell. When the total amount of the lanthanoid having a light-absorbing function and the lanthanoid having a light-emitting function in the outer shell is equal to or less than the upper limit, leakage of energy due to absorption or emission of light in the outer shell is suppressed so that high luminous efficiency is exhibited. The lower limit of the total amount of the lanthanoid having a light-absorbing function and the lanthanoid having a light-emitting function contained in the outer shell is preferably 0 mol % and the upper limit thereof is preferably 1 mol %. The total amount of the lanthanoid having a light-absorbing function and the lanthanoid having a light-emitting function contained in the outer shell is more preferably 0 mol %.

The lower limit of the thickness of the outer shell is 2 nm and the upper limit thereof is 20 nm. When the thickness of the outer shell is equal to or greater than the lower limit and equal to or smaller than the upper limit, light scattering can be reduced so that long-wavelength light such as infrared rays is not disturbed to reach the core particle having a light-absorbing function and loss upon emission of light is reduced. As a result, prevention of energy leakage and the light-absorbing function can be both achieved. The lower limit of the thickness of the outer shell is preferably 2.5 nm and the upper limit thereof is preferably 10 nm. In the case where the shell layer consists of the outer shell alone, the thickness of the outer shell can be obtained by measuring the particle size of the fine particle including the core particle and the outer shell formed on the surface of the core particle with an electron microscope, and calculating the difference between the obtained particle size of the fine particle and the particle size of the core particle. In the case where the shell layer further includes an inner shell between the outer shell and the core particle, the thickness of the outer shell can be obtained by measuring the particle size of the fine particle including the inner shell and the outer shell formed on the surface of the inner shell with an electron microscope, and calculating the difference between the obtained particle size of the fine particle and the particle size of a fine particle including the core particle and the inner shell formed on the surface of the core particle.

The ratio between the average particle size of the core particle and the thickness of the outer shell (average particle size of the core particle/thickness of the outer shell) is preferably 2 or more, more preferably 2.5 or more, while preferably 50 or less, more preferably 25 or less.

The lanthanoid-containing inorganic material fine particle of the present invention may further have an inner shell in the shell layer between the outer shell and the core particle. When having the shell layer including an inner shell, the lanthanoid-containing inorganic material fine particle of the present invention can absorb long-wavelength light such as infrared rays more efficiently.

The inner shell refers to a structure having a lanthanoid content different from those of the core particle and the outer shell.

Examples of the lanthanoid having a light-absorbing function contained in the inner shell include those exemplified for the lanthanoid having a light-absorbing function contained in the core particle.

The inner shell preferably contains an element having a similar ionic radius or a similar structure upon crystallization to that of the lanthanoids, or a compound thereof. Examples of the element having a similar ionic radius or a similar structure upon crystallization to that of the lanthanoids and the compound thereof include those exemplified for the element having a similar ionic radius or a similar structure upon crystallization to that of the lanthanoids and the compound thereof included in the core particle.

The upper limit of the amount of the lanthanoid having a light-absorbing function contained in the inner shell is 75 mol % based on the total amount of the rare earth elements contained in the inner shell. When the amount of the lanthanoid having a light-absorbing function is equal to or smaller than the upper limit, the self-energy loss due to energy exchange between the lanthanoids having a light-absorbing function contained in the inner shell is not likely to occur, and the absorbed energy is efficiently transferred to the core particle so that high luminous efficiency is exhibited. The lower limit of the amount of the lanthanoid having a light-absorbing function is preferably 2 mol %, more preferably 2.5 mol %, while the upper limit thereof is preferably 50 mol %.

The upper limit of the amount of the lanthanoid having a light-emitting function contained in the inner shell is 2 mol % based on the total amount of the rare earth elements contained in the inner shell. When the amount of the lanthanoid having a light-emitting function is equal to or less than the upper limit, the energy of light absorbed in the inner shell is efficiently transferred to the core particle so that high luminous efficiency is exhibited. The lower limit of the amount of the lanthanoid having a light-emitting function contained in the inner shell is preferably 0 mol % and the upper limit thereof is preferably 1 mol %. The amount of the lanthanoid having a light-emitting function contained in the inner shell is more preferably 0 mol %.

The lower limit of the thickness of the inner shell is preferably 2 nm, more preferably 2.5 nm, while the upper limit thereof is preferably 20 nm, more preferably 10 nm. When the thickness of the inner shell is equal to or greater than the preferable lower limit and equal to or smaller than the preferable upper limit, the lanthanoid having a light-absorbing function contained in the inner shell can be positioned near the core particle to allow more efficient transfer of the energy absorbed in the inner shell to the core particle, thereby enhancing the luminous efficiency. Moreover, loss of the incident light or light emission can be reduced to enhance the luminous efficiency. The thickness of the inner shell can be obtained by measuring the particle size of the fine particle including the core particle and the inner shell formed on the surface of the core particle with an electron microscope, and calculating the difference between the obtained particle size and the particle size of the core particle.

The ratio between the average particle size of the core particle and the thickness of the inner shell (average particle size of the core particle/thickness of the inner shell) is preferably 2 or more, more preferably 2.5 or more, while preferably 50 or less, more preferably 25 or less. When the ratio between the average particle size of the core particle and the thickness of the inner shell is equal to or more than the preferable lower limit and equal to or less than the preferable upper limit, the distance between the lanthanoid having a light-absorbing function contained in the inner shell and the lanthanoid having a light-emitting function contained in the core particle is sufficiently short, thereby enhancing the efficiency of the energy transfer. Moreover, sufficient light-absorbing function can be exhibited to enhance the luminous efficiency.

The ratio between the thickness of the inner shell and the thickness of the outer shell (thickness of the inner shell/thickness of the outer shell) is preferably 0.1 or more, more preferably 0.5 or more, while preferably 10 or less, more preferably 5 or less.

In the lanthanoid-containing inorganic material fine particle of the present invention, the core particle and the shell layer have no interface at a contact face to form a continuous body. In the case where the core particle and the shell layer have no interface at a contact face to form a continuous body, the surface of the core particle is not contaminated by oxidation or the like, and therefore occurrence of energy loss or light scattering due to crystal defects is suppressed at the contact face between the core particle and the shell layer, thereby enhancing the luminous efficiency.

The state where the core particle and the shell layer have no interface at a contact face to form a continuous body means that the shell layer is formed on the surface of the core particle by epitaxial crystal growth.

Whether or not the core particle and the shell layer have no interface at a contact face to form a continuous body can be determined by analyzing the crystal structure of the core particle before formation of the shell layer and the crystal structure of the shell layer formed on the surface of the core particle in the lanthanoid-containing inorganic material fine particle with an X-ray diffraction analyzer. When the peaks observed are the same and not different from each other, the core particle and the shell layer are confirmed to form a continuous body. In the case where the surface of the core particle is contaminated by oxidation or the like, different peaks are observed upon analysis of the crystal structure of the shell layer and the crystal structure of the core particle.

Alternatively, whether or not the core particle and the shell layer have no interface at a contact face to form a continuous body can be also determined by analyzing the cross section of the lanthanoid-containing inorganic material fine particle including the core particle and the shell layer formed on the surface of the core particle with a transmission electron microscope. When crystal units are arrayed in the same direction between the core particle and the shell layer with no disorder in the orientation of the crystal units, the core particle and the shell layer are determined to have no interface at a contact face to form a continuous body. In the case where the surface of the core particle is contaminated by oxidation or the like, an image where the orientation of the crystal units is remarkably disordered between the core particle and the shell layer is observed.

In the case where the shell layer includes an inner shell and an outer shell in the lanthanoid-containing inorganic material fine particle of the present invention, the inner shell and the outer shell preferably have no interface at a contact face to form a continuous body. In the case where the inner shell and the outer shell form a continuous body with no interface at a contact face, the surface of the core particle or the surface of the inner shell are not contaminated by oxidation or the like and therefore occurrence of energy loss or light scattering due to crystal defects at each contact face can be suppressed, thereby enhancing the luminous efficiency.

The state where the inner shell and the outer shell have no interface at a contact face to form a continuous body means that the outer shell is formed on the surface of the inner shell by epitaxial crystal growth.

Whether or not the inner shell and the outer shell have no interface at a contact face to form a continuous body can be determined by analyzing the crystal structure of the inner shell in a fine particle including a core particle and the inner shell formed on the surface of the core particle and the crystal structure of the outer shell in a fine particle further including the outer shell with an X-ray diffraction analyzer. When the peaks observed are the same and not different from each other, the inner shell and the outer shell are confirmed to form a continuous body. In the case where the surface of the core particle or the inner shell is contaminated by oxidation or the like, different peaks are observed upon analysis of the crystal structures of the inner shell and the outer shell.

Alternatively, whether or not the inner shell and the outer shell have no interface at a contact face to form a continuous body can be determined by analyzing the cross section of a fine particle including an inner shell and an outer shell sequentially formed on the surface of a core particle with a transmission electron microscope. When crystal units are arrayed in the same direction between the inner shell and the outer shell with no disorder in the orientation of the crystal units, the inner shell and the outer shell are determined to have no interface at a contact face to form a continuous body. In the case where the surface of the core particle or the inner shell is contaminated by oxidation or the like, an image where the orientation of the crystal units is remarkably disordered between the inner shell and the outer shell is observed.

The lanthanoid-containing inorganic material fine particle of the present invention preferably has at least two organic compounds selected from the group consisting of a fatty acid, an organophosphorus compound, an organosulfur compound, and an amine compound on the surface of the shell layer. With such a structure, contamination of the surface of the lanthanoid-containing inorganic material fine particle by oxidation or the like can be prevented, thereby reducing energy loss due to light scattering or the like.

Examples of the fatty acid include saturated fatty acids such as behenic acid, stearic acid, palmitic acid, myristic acid, lauric acid, capric acid, caprylic acid, and coconut fatty acid; and unsaturated fatty acids such as oleic acid, linoleic acid, linolenic acid, sorbic acid, tallow fatty acid, and hydroxy stearic acid. Preferred among these is oleic acid.

Examples of the organophosphorus compound include phosphines, phosphine oxides, phosphonium salts, phosphinites, phosphonites, and phosphites.

Examples of the phosphines include trialkylphosphines such as trimethylphosphine, triethylphosphine, tripropylphosphine, tributylphosphine, and trioctylphosphine; triarylphosphines such as triphenylphosphine, tritoluylphosphine, and trixylylphosphine; tertiary alkylarylphosphines such as diphenylpropylphosphine and phenyldipropylphosphine.

Examples of the phosphine oxides include oxides of the above phosphines.

Examples of the phosphonium salts include tetra-n-butylphosphonium salts such as tetra-n-butylphosphonium bromide and tetra-n-butyl phosphonium chloride; tetraethylphosphonium salts such as tetraethylphosphonium bromide and tetraethylphosphonium chloride; tetraphenylphosphonium salts such as tetraphenylphosphonium bromide and tetraphenylphosphonium chloride; tetrabenzylphosphonium salts such as tetrabenzylphosphonium bromide and tetrabenzylphosphonium chloride; and trimethylbenzylphosphonium salts such as trimethylbenzylphosphonium bromide and trimethylbenzylphosphonium chloride.

Examples of the phosphinites include arylphosphinites such as diphenylphenoxyphosphine and ditolyltolyloxyphosphine; alkylphosphinites such as dibutylbutoxyphosphine; and alkylarylphosphinites such as diethylphenoxyphosphine.

Examples of the phosphonites include arylphosphinites such as phenyldiphenoxyphosphine; alkylphosphonites such as butyldibutoxyphosphine; and alkylarylphosphonites such as phenyldibutoxyphosphine.

Examples of the phosphites include aryl phosphites such as triphenyl phosphite; alkyl phosphites such as tributyl phosphite; and alkylaryl phosphites such as dimethylphenyl phosphite. Preferred among these are trioctyl phosphine and trioctyl phosphine oxide.

Examples of the organosulfur compounds include thiol compounds, sulfide compounds, and thiophene compounds.

Examples of the thiol compounds include aromatic thiol compounds such as thiophenol, toluenethiol, chlorothiophenol, and benzenedithiol; and aliphatic thiol compounds such as butanthiol, octanethiol, and dodecanethiol.

Examples of the sulfide compounds include mercaptophenyl sulfide, diphenyl sulfide, diphenyl disulfide, dibutyl sulfide, dibutyl disulfide, dioctyl sulfide, and dioctyl disulfide.

Examples of the thiophene compounds include thiophene, thiophenecarboxylic acid, thiophenecarboxaldehyde, and thiopheneamine.

Examples of the amine compounds include aliphatic polyamines, alicyclic polyamines, aromatic polyamines, hydrazides, and guanidine derivatives.

Examples of the aliphatic polyamines include diethylenetriamine, triethylenetetramine, tetraethylenepentamine, and diethylaminopropylamine.

Examples of the alicyclic polyamines include menthene diamine, isophorone diamine, N-aminoethyl piperazine, 3,9-bis(3-aminopropyl)-2,4,8,10-tetraoxaspiro(5,5)undecane adduct, bis(4-amino-3-methylcyclohexyl)methane, and bis(4-aminocyclohexyl) methane.

Examples of the aromatic polyamines include m-phenylenediamine, p-phenylenediamine, o-xylenediamine, m-xylenediamine, p-xylenediamine, 4,4-diaminodiphenylmethane, 4,4-diaminodiphenylpropane, 4,4-diaminodiphenylsulfone, 4,4-diaminodicyclohexane, bis(4-aminophenyl) phenylmethane, 1,5-diaminonaphthalene, 1,1-bis(4-aminophenyl)cyclohexane, 2,2-bis[(4-aminophenoxy) phenyl]propane, bis[4-(4-aminophenoxy)phenyl]sulfone, 1,3-bis(4-aminophenoxy)benzene, 4,4-methylene-bis(2-chloroaniline), and 4,4-diaminodiphenylsulfone.

Examples of the hydrazides include carbodihydrazide, adipic acid dihydrazide, sebacic acid dihydrazide, dodecanedioic acid dihydrazide, and isophthalic acid dihydrazide.

Examples of the guanidine derivatives include dicyandiamide, 1-o-tolyldiguanide, α-2,5-dimethylguanide, α,ω-phenyldiguanide, α,α-bisguanylguanidino diphenyl ether, p-chlorophenyl diguanide, α,α-hexamethylenebis[ω-(p-chlorophenol)]diguanide, phenyldiguanide oxalate, acetylguanidine, and diethylcyanoacetylguanidine.

The lanthanoid-containing inorganic material fine particle of the present invention preferably further has a polymer layer containing a polymer and noble metal particles around the shell layer. The presence of the polymer layer allows expression of SPR by the noble metal particles contained in the polymer layer, thereby further increasing the emission intensity.

Examples of the polymer contained in the polymer layer include homopolymers and copolymers of monomers having a vinyl group and an amino group (e.g., N-vinyl pyrrolidone, N-vinyl caprolactam) and of monomers having an acrylic group and an amino group (e.g., acryloyl morpholine, dimethylaminoethyl acrylate, dimethylaminoethyl methacrylate, acrylamide, N,N-dimethyl acrylamide). Preferred among these are polymers of a monomer having an acrylic group and an amino group, and more preferred is a polymer of dimethylaminoethyl methacrylate.

Examples of the noble metal constituting the noble metal particles include gold, silver, platinum, palladium, and rhodium. Preferred among these is gold.

The lower limit of the average particle size of the noble metal particles is preferably 1 nm and the upper limit thereof is preferably 75 nm.

When the average particle size of the noble metal particles is equal to or larger than the preferable lower limit and equal to or smaller than the preferable upper limit, the distance between the noble metal particle expressing SPR and the core particle exhibiting an up-conversion function or the like is appropriate and therefore the light amplified by expression of SPR can be efficiently used, thereby further increasing the emission intensity.

The lower limit of the average particle size of the noble metal particles is more preferably 2.5 nm and the upper limit thereof is more preferably 50 nm.

The average particle size of the noble metal particles can be measured by observation using, for example, a transmission electron microscope.

The lower limit of the amount of the noble metal particles in the polymer layer is preferably 5 vol % and the upper limit thereof is preferably 75 vol %.

When the amount of the noble metal particles is equal to or more than the preferable lower limit and equal to or less than the preferable upper limit, SPR can be sufficiently expressed, thereby further increasing the emission intensity.

The lower limit of the amount of the noble metal particles is more preferably 10 vol % and the upper limit thereof is more preferably 50 vol %.

The amount of the noble metal particles in the polymer layer can be measured by image analysis of the amount of the noble metal particles in the polymer layer in an observation using, for example, a transmission electron microscope.

The lower limit of the thickness of the polymer layer is preferably 5 nm and the upper limit thereof is preferably 250 nm.

When the thickness of the polymer layer is equal to or greater than the preferable lower limit and equal to or smaller than the preferable upper limit, the light amplified by the expression of SPR can be efficiently used, thereby further increasing the emission intensity. The lower limit of the thickness of the polymer layer is more preferably 7.5 nm and the upper limit thereof is more preferably 75 nm.

The thickness of the polymer layer can be obtained by measuring the particle size of the fine particle in which the polymer layer is formed using an electron microscope and subtracting the average particle size of the core particle and the thickness of other layers such as the shell layer from the measured particle size.

The shape of the polymer layer is not particularly limited, and is preferably a polymer brush layer. The polymer layer being a polymer brush layer allows uniform dispersion of the noble metal particles and can hold the noble metal particles more firmly.

The polymer brush as used herein refers to an aggregate of polymers in which one end is fixed by chemical bonding or adsorption to the surface of the particle in which the shell layer is formed or the particle in which an intermediate layer described later is further formed and the other end is not fixed as a free end. The polymer brush layer may have a structure in which the polymer brush is partially crosslinked.

The lanthanoid-containing inorganic material fine particle of the present invention may further have an intermediate layer between the shell layer and the polymer layer.

The presence of the intermediate layer allows formation of a dense polymer brush layer.

The substance constituting the intermediate layer is not particularly limited. Examples thereof include metal oxides such as silica (silicon dioxide), titania (titanium dioxide), alumina (aluminum oxide), zirconia (zirconium oxide), ceria (cerium oxide), magnesia (magnesium oxide), and ferrite (iron oxide); inorganic salts such as barium titanate and lead zirconate titanate; metallic borides such as titanium boride, zirconium boride, vanadium boride, and tungsten boride; nitrides such as silicon nitride, aluminum nitride, and boron nitride; and inorganic compounds such as silicon carbide; and organic compounds such as polyethylene glycol.

The thickness of the intermediate layer is only required to fall within a range that does not disturb the up-conversion function of the lanthanoid-containing inorganic material fine particle of the present invention. The upper limit thereof is preferably 10 nm.

When the thickness of the intermediate layer is equal to or smaller than the preferable upper limit, energy of long-wavelength light such as infrared rays and light amplified by SPR can reach the core particle without being disturbed and energy loss upon emission of light can be reduced, thereby achieving high emission intensity.

The lower limit of the thickness of the intermediate layer is preferably 0.5 nm and the upper limit thereof is preferably 5 nm.

The thickness of the intermediate layer can be obtained by measuring the particle size of the fine particle in which the intermediate layer is formed using an electron microscope, followed by calculation based on the measured particle size, the average particle size of the core particle, and the thickness of the shell layer.

The lanthanoid-containing inorganic material fine particle of the present invention may be produced by any method. In an exemplary method, a core particle containing a lanthanoid having a light-absorbing function and a lanthanoid having a light-emitting function is produced, and an outer shell serving as a shell layer is formed on the surface of the core particle. In another exemplary method, a core particle containing a lanthanoid having a light-absorbing function and a lanthanoid having a light-emitting function is produced, an inner shell is formed on the surface of the core particle by using a solution containing a lanthanoid having a light-absorbing function, and an outer shell is formed on the surface of the inner shell, thereby forming a shell layer.

The core particle containing a lanthanoid having a light-absorbing function and a lanthanoid having a light-emitting function may be produced by any method. In an exemplary method, a metal ion-containing solution is prepared by dissolving a metal salt containing a lanthanoid having a light-absorbing function, a metal salt containing a lanthanoid having a light-emitting function, a metal salt containing an element having a similar ionic radius or a similar structure upon crystallization to that of the lanthanoids, an alkali solution, and a fluoride solution in a solvent prepared from organic compounds, and the metal ion-containing solution is heated at high temperatures so that core particles formed of a fluoride is precipitated.

Examples of the metal salt containing a lanthanoid having a light-absorbing function and the metal salt containing a lanthanoid having a light-emitting function include oxyacid salts (e.g., nitrate salts, sulfate salts, phosphate salts, borate salts, silicate salts, vanadate salts) of a lanthanoid, carboxylate salts (e.g., acetate salts) of a lanthanoid, organic acid salts (e.g. sulfonate salts, phenol salts, sulfinate salts, salts of a 1,3-diketone-type compound, thiophenolate salts, oxime salts, aromatic sulfonamide salts, salts of primary and secondary nitro compounds, and lanthanoid chlorides. Preferred among these are carboxylate salts such as acetate salts.

The solvent used for the metal ion-containing solution is preferably, for example, a solvent mixture containing at least two organic compounds selected from the group consisting of a fatty acid, an organophosphorus compound, an organosulfur compound, and an amine compound. The use of the solvent mixture allows strong coordination of the organic compound on the surface of an inorganic fine particle to effectively suppress contamination by oxidation or the like of the surface of the core particle to be obtained and during formation of the inner shell and the outer shell.

The solvent mixture preferably further contains an organic solvent for the purpose of dilution, such as octadecene.

Examples of the metal salt containing an element having a similar ionic radius or a similar structure upon crystallization to that of the lanthanoids include oxyacid salts (nitrate salts, sulfate salts, phosphate salts, borate salts, silicate salts, vanadate salts), carboxylate salts (e.g., acetate salts), organic acid salts (sulfonate salts, phenol salts, sulfinate salts, salts of a 1,3-diketone-type compound, thiophenol salts, oxime salts, aromatic sulfonamide salts, salts of primary and secondary nitro compounds) and chlorides of the element having a similar ionic radius or a similar structure upon crystallization to that of the lanthanoids. Preferred among these are carboxylate salts such as acetate salts.

Examples of the alkali solution include those containing sodium hydroxide, calcium hydroxide, ammonium fluoride, or the like. The amount of the alkali solution can be appropriately selected in accordance with the type and concentration of the metal ion-containing solution.

Examples of the fluoride solution include those containing sodium fluoride, ammonium fluoride, or the like. The amount of the fluoride solution can be appropriately selected in accordance with the type and concentration of the metal ion-containing solution.

The inner shell may be formed on the surface of the core particle by any method. In an exemplary method, a metal ion-containing solution is prepared by dissolving a metal salt containing the lanthanoid having a light-absorbing function, a metal salt containing the element having a similar ionic radius or a similar structure upon crystallization to that of the lanthanoids, an alkali solution, and a fluoride solution in a solvent prepared from organic compounds, and the core particles are added to the metal ion-containing solution, followed by heating at high temperatures. Thus, fine particles each including the core particle and the inner shell formed on the surface of the core particle are precipitated.

In this process, formation of a shell from the metal ion can be performed while contamination by oxidation or the like is effectively prevented by strong coordination of the organic compound with the core particle surface.

The metal salt containing the lanthanoid having a light-absorbing function, the metal salt containing an element having a similar ionic radius or a similar structure upon crystallization to that of the lanthanoids, the solvent, the alkali solution, and the fluoride solution may be the same as those used for preparation of the core particles.

The outer shell may be further formed on the surface of the core particle by any method. In an exemplary method, a metal ion-containing solution is prepared by dissolving a metal salt containing an element having a similar ionic radius or a similar structure upon crystallization to that of the lanthanoids, an alkali solution, and a fluoride solution in a solvent prepared from organic compounds, and the core particles are added to the metal ion-containing solution, followed by heating at high temperatures. Thus, lanthanoid-containing inorganic material fine particles each including the core particle and the shell layer formed on the surface of the core particle are precipitated.

In this process, formation of a shell from the metal ion can be performed while contamination by oxidation or the like is effectively prevented by strong coordination of the organic compound with the core particle surface.

The outer shell may be further formed on the fine particle including the core particle and the inner shell formed on the surface of the core particle by any method. In an exemplary method, a metal ion-containing solution is prepared by dissolving a metal salt containing an element having a similar ionic radius or a similar structure upon crystallization to that of the lanthanoids, an alkali solution, and a fluoride solution in a solvent prepared from organic compounds, and the fine particles each including the core particle and the inner shell formed on the surface of the core particle are added to the metal ion-containing solution, followed by heating at high temperatures. Thus, lanthanoid-containing inorganic material fine particles each having a shell layer including the inner shell and the outer shell are precipitated.

In this process, formation of a shell from the metal ion can be performed while contamination by oxidation or the like is effectively prevented by strong coordination of the organic compound with the inner shell surface.

The metal salt containing an element having a similar ionic radius or a similar structure upon crystallization to that of the lanthanoids, the solvent, the alkali solution, and the fluoride solution may be the same as those used for preparation of the core particles.

In the case where the lanthanoid-containing inorganic material fine particle of the present invention has a polymer layer, the polymer layer may be formed by any method. In an exemplary method, a polymer layer is directly formed on the surface of the particle having the shell layer formed thereon. In another exemplary method, an intermediate layer is formed on the surface of the shell layer, and a polymer layer is further formed on the surface of the intermediate layer. A polymer brush layer may be formed on the surface of the shell layer or the surface of the intermediate layer.

In the case where the lanthanoid-containing inorganic material fine particle of the present invention has an intermediate layer, the intermediate layer may be formed, for example, by adding and reacting a raw material of an inorganic substance so that the surface of the shell layer is laminated with the inorganic substance, or by adding and reacting an inorganic powder so that the surface of the shell layer is laminated with the inorganic substance.

Examples of the raw material of an inorganic substance include metal alkoxides and compounds having both a metal alkoxide and an organic functional group in a molecule. Specific examples thereof include tetraethoxysilane (tetraethyl orthosilicate), tetramethoxysilane, titanium isopropoxide, titanium normal butoxide, methacryloxypropyl trimethoxysilane, vinyltrimethoxysilane, and tetrabutyl orthotitanate.

Examples of the inorganic powder include powders of silica (silicon dioxide), titania (titanium dioxide), alumina (aluminum oxide), zirconia (zirconium oxide), ceria (cerium oxide), magnesia (magnesium oxide), ferrite (iron oxide), silicon carbide, silicon nitride, aluminum nitride, boron nitride, barium titanate, lead zirconate titanate, titanium boride, zirconium boride, vanadium boride, and tungsten boride. These inorganic powders may be reacted with a silane coupling agent or the like so that an intermediate layer is stacked.

A polymer layer may be formed around the shell layer, for example, by introducing living polymerization initiation points to the surface of the particle having the shell layer formed thereon, carrying out cross-linking living polymerization using the monomer constituting the polymer of the polymer layer, and further adding a compound containing a noble metal, or by forming an intermediate layer on the surface of the particle having the shell layer formed thereon, introducing living polymerization initiation points to the surface of the particle having the intermediate layer formed thereon, carrying out cross-linking living polymerization using the monomer constituting the polymer of the polymer layer, and further adding a compound containing a noble metal. Cross-linking living polymerization of the monomer allows the polymer brushes growing from all the living polymerization initiation points to have the similar length and the polymer brush layer to have a uniform thickness.

Living polymerization initiation points are introduced to the surface of the particle having the shell layer formed thereon or the particle having the intermediate layer formed thereon, for example, by adding a monomer having a halogen to the particle having the shell layer formed thereon or the particle having the intermediate layer formed thereon and then polymerizing the added monomer.

Examples of the method of adding and polymerizing the monomer having a halogen include fine particle polymerization methods such as a suspension polymerization method, an emulsion polymerization method, a mini-emulsion polymerization method, a soap-free polymerization method, a dispersion polymerization method, and a seed polymerization method.

The cross-linking living polymerization using a monomer constituting the polymer of the polymer layer may be carried out by any method. Preferred examples thereof include atom transfer radical polymerization (hereafter, also referred to as ATRP method) and living polymerization using an iniferter initiator (iniferter polymerization).

In an exemplary method employing the ATRP method, particles each having a halogen introduced to the surface of the particle having the shell layer formed thereon or the particle having the intermediate layer formed thereon, a transition metal complex, a monomer, and the like are used. The halogen introduced to the surface of the particle acts as a reaction-starting point of living polymerization in the ATRP method.

The transition metal complex used may be a compound represented by the following formula (1):

M is not particularly limited as long as it is a transition metal. Preferred is a copper atom.

Z represents a halogen atom, and preferred examples thereof include fluorine, chlorine, bromine, and iodine atoms. Preferred among these is a chlorine atom.

(D) represents a ligand, and is not particularly limited as long as it can form a coordinate bond with a transition metal. Preferred are multidentate ligands mentioned below.

Examples of the multidentate ligands include 2,2'-bipyridyl, 2,2'-bi-4-heptylpyridyl, 2-(N-pentyliminomethyl) pyridine, sparteine, tris(2-dimethylaminoethyl) amine, 1,1,4,7,7-pentamethyl diethylenetriamine, and 1,1,4,7,10,10-hexamethyl triethylenetetramine. These ligands may be used alone or in combination of two or more thereof.

For the purpose of activating the reaction, to the transition metal complex may be added a radical generator (e.g., peroxide, azo compound) and a reducing agent (e.g., ascorbic acid, organotin compound).

The compound containing a noble metal may be any compound that can produce a noble metal ion and allows precipitation of noble metal particles. Examples thereof include chlorauric acid, chloroplatinic acid, palladium chloride, and silver nitrate.

The lanthanoid-containing inorganic material fine particle of the present invention can be applied for medical use such as biomarkers, solar cells such as dye sensitization solar cells, and wavelength-conversion ink such as security ink.

The present invention also encompasses a wavelength conversion ink containing the lanthanoid-containing inorganic material fine particle of the present invention.

The wavelength conversion ink of the present invention contains the lanthanoid-containing inorganic material fine particle of the present invention and a solvent.

Because of the presence of the lanthanoid-containing inorganic material fine particle of the present invention, the wavelength conversion ink of the present invention used for printing on a print substrate can maintain readably strong emission intensity under irradiation with long-wavelength light such as infrared rays. In addition, when a coated article printed with the wavelength conversion ink of the present invention gets wet, the wavelength conversion ink repels water to suppress dissolution of the lanthanoid-containing inorganic material fine particle or disintegration of the part coated with the ink, thereby retaining the favorable state of the printing pattern.

The lower limit of the amount of the lanthanoid-containing inorganic material fine particle in the wavelength conversion ink of the present invention is preferably 0.01% by weight and the upper limit thereof is preferably 75% by weight.

The solvent is not particularly limited as long as it allows easy dispersion of the lanthanoid-containing inorganic material fine particles. Examples thereof include toluene, hexane, cyclohexane, heptane, cycloheptane, octane, decane, undecane, dodecane, tridecane, trimethylpentane, benzene, and xylene.

The lower limit of the amount of the solvent in the wavelength conversion ink of the present invention is preferably 1% by weight and the upper limit thereof is preferably 99.99% by weight.

The wavelength conversion ink of the present invention may contain additives such as a binder, a dispersant, and a viscosity modifier.

The application of the wavelength conversion ink of the present invention is not particularly limited. The wavelength conversion ink of the present invention is particularly useful as security ink used for the anticounterfeiting purpose because the wavelength conversion ink of the present invention is transparent under visible light, can provide a print substrate with second information that is fluorescent under irradiation with long-wavelength light such as infrared rays, and has an emission spectrum adjustable by changing the composition of the lanthanoid-containing inorganic material fine particle included in the wavelength conversion ink.

The wavelength conversion ink of the present invention may be produced by any method. In an exemplary method, the lanthanoid-containing inorganic material fine particles and optionally added additives such as a binder are dispersed and dissolved in the solvent using an ultrasonic disperser or the like to prepare an ink.

Coating of a substrate with the wavelength conversion ink of the present invention enables printing of a pattern that is transparent under visible light and is fluorescent under long-wavelength light such as infrared rays.

The present invention also encompasses a coated article with printing with the wavelength conversion ink of the present invention.

The coated article of the present invention includes the wavelength conversion ink of the present invention and a substrate.

The substrate is not particularly limited, and examples thereof include paper produced from pulp, cotton, and other plant fibers, and plastic films such as polycarbonate, polyethylene, polypropylene, and polyethylene terephthalate films.

Printing with the wavelength conversion ink of the present invention on the substrate may be performed by any method, and a conventionally known printing method may be employed.

By evaluating the emission spectrum and the printing pattern of the wavelength conversion ink on the coated article of the present invention, the authenticity of the information printed on the substrate with the wavelength conversion ink can be determined.

The present invention also encompasses a determination apparatus that evaluates the emission spectrum and the printing pattern of the wavelength conversion ink on the coated article.

The determination apparatus of the present invention has an irradiation means for infrared irradiation of the coated article of the present invention and a detection means for detecting an emission spectrum generated by the infrared irradiation and a printing pattern of the wavelength conversion ink.

The irradiation means included in the determination apparatus of the present invention is not particularly limited as long as it can radiate infrared rays that allow the lanthanoid-containing inorganic material fine particles contained in the wavelength conversion ink of the present invention to emit light. A conventionally known infrared irradiation device can be used.

The detection means included in the determination apparatus of the present invention is only required to have a function of detecting the emission spectrum of the lanthanoid-containing inorganic material fine particles contained in the wavelength conversion ink of the present invention and a function of detecting the printing pattern of the wavelength conversion ink.

As the detection means, a device that performs detection of the emission pattern and detection of the printing pattern may be used alone. Alternatively, a device that detects the emission spectrum and a device that detects the printing pattern may be used in combination.

Advantageous Effects of Invention

The present invention can provide a lanthanoid-containing inorganic material fine particle that enables achievement of high luminous efficiency with less energy outflow upon conversion of the wavelength of light to a shorter wavelength. The present invention also provides a wavelength conversion ink capable of maintaining high emission intensity at the time of wavelength conversion for a long period of time, having high water repellency, and capable of forming a printing pattern excellent in retention properties, a coated article produced using the wavelength conversion ink, and a determination apparatus.

DESCRIPTION OF EMBODIMENTS

Figure 1:
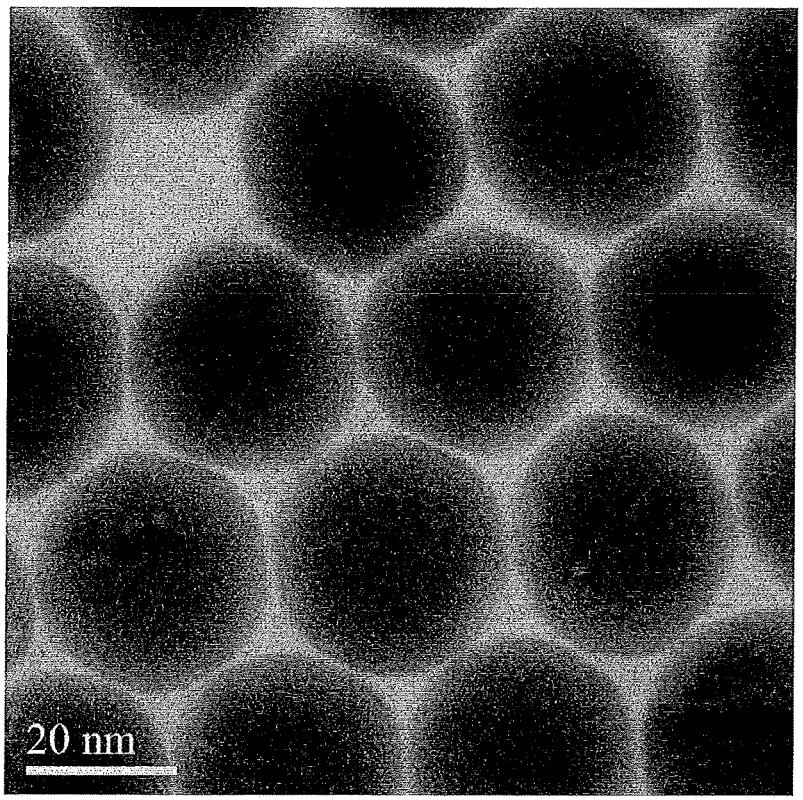
FIG. 1 is an electron microscopic photograph of core particles obtained in Example 1.

The present invention is more specifically described in the following with reference to, but not limited to, examples.

EXAMPLE 1

(Preparation of Lanthanoid-Containing Inorganic Material Fine Particles)
(Preparation of Core Particles)

A metal ion-containing solution A-1 was prepared by dissolving 0.40 g of yttrium acetate, 0.13 g of ytterbium acetate, and 0.013 g of erbium acetate in a solvent mixture containing 11.13 g of oleic acid, 10.39 g of trioctyl phosphine, and 46.03 g of octadecene. A solution obtained by dissolving 0.15 g of sodium hydroxide and 0.39 g of ammonium fluoride in 15 g of methanol was added right after the preparation thereof to the metal ion-containing solution A-1, thereby preparing a reaction precursor solution A-1.

The reaction precursor solution A-1 was heated with stirring in vacuum at 50° C. for 15 minutes so that methanol was vaporized to be removed from the solution. Then, the resulting solution was further heated with stirring in nitrogen atmosphere at 315° C. for 60 minutes so that fine particles were precipitated in the solution.

The solution was cooled to room temperature and 25 g of ethanol was added thereto so that the fine particles were settled. The fine particles were recovered using a centrifugation device. Washing treatment was repeated several times in which the recovered fine particles were re-dispersed in 25 g of toluene, 25 g of ethanol was again added thereto for re-aggregation of the fine particles, and the re-aggregated fine particles were recovered using a centrifugation device. Core particles were thus obtained.

(Formation of a Shell Layer (Outer Shell))

A metal ion-containing solution A-2 was prepared by dissolving 0.51 g of yttrium acetate in a solvent mixture containing 16.69 g of oleic acid, 5.19 g of trioctyl phosphine, and 46.03 g of octadecene. A solution obtained by dissolving 0.15 g of sodium hydroxide and 0.39 g of ammonium fluoride in 15 g of methanol was added right after the preparation thereof to the metal ion-containing solution A-2, thereby preparing a reaction precursor solution A-2.

The core particles obtained in (Preparation of core particles) were added to the reaction precursor solution A-2 and dispersed therein. The resulting reaction precursor solution A-2 containing the core particles dispersed therein was heated with stirring in vacuum at 50° C. for 15 minutes so that methanol was vaporized to be removed from the solution. The resulting solution was heated with stirring in nitrogen atmosphere at 315° C. for 60 minutes so that fine particles each including a core particle and a shell layer (outer shell) formed on the surface of the core particle were precipitated.

The solution was cooled to room temperature, and 25 g of ethanol was added thereto so that the fine particles were settled. The fine particles were recovered using a centrifugation device. Washing treatment was repeated several times in which the recovered fine particles were re-dispersed in 25 g of toluene, 25 g of ethanol was again added thereto for re-aggregation of the fine particles, and the re-aggregated fine particles were recovered using a centrifugation device. Lanthanoid-containing inorganic material fine particles were thus obtained.

The washing solvent remaining in the obtained lanthanoid-containing inorganic material fine particles was removed using a vacuum dryer, and the lanthanoid-containing inorganic material fine particles were sealed in a nitrogen-atmosphere hermetic container until the evaluation was performed.

The amounts of a lanthanoid having a light-absorbing function, a lanthanoid having a light-emitting function, and an element having a similar ionic radius or a similar structure upon crystallization to that of the lanthanoids contained in the core particle and the shell layer of the obtained lanthanoid-containing inorganic material fine particle were measured using a fluorescence X-ray analyzer (EDX-800HS available from Shimadzu Corporation).

In addition, the presence of $NaYF_4$ in the core particle and the shell layer was confirmed based on the peak pattern using an X-ray diffractometer.

EXAMPLE 2

Lanthanoid-containing inorganic material fine particles were obtained in the same manner as in Example 1, except that 0.26 g of yttrium acetate, 0.07 g of sodium hydroxide, and 0.19 g of ammonium fluoride were used in (Formation of a shell layer (outer shell)) in Example 1.

EXAMPLE 3

Lanthanoid-containing inorganic material fine particles were obtained in the same manner as in Example 1, except that 5.1 g of yttrium acetate, 45 g of methanol, 1.5 g of sodium hydroxide, and 3.9 g of ammonium fluoride were used in (Formation of a shell layer (outer shell)) in Example 1.

EXAMPLE 4

(Formation of an Intermediate Layer)

A dispersion was prepared by dispersing 0.1 g of the lanthanoid-containing inorganic material fine particles obtained in Example 1 in 200 ml of cyclohexane. To the obtained dispersion was added a mixed liquid obtained by mixing 50 ml of cyclohexane and 25 ml of a surfactant (Igepal-520 available from Sigma-Aldrich Co. LLC.). To the resulting mixture was further added 20 ml of 28% ammonia water, and the mixture was stirred for one hour. Then, 2.5 ml of tetraethyl orthosilicate (TEOS) was added, followed by stirring for 24 hours. Washing treatment was repeated several times in which the fine particles were recovered using a centrifugation device, re-dispersed in ethanol, and recovered again using a centrifugation device. Thus, $SiO_2$ layer-formed fine particles each including a $SiO_2$ layer on the surface as an intermediate layer were produced.

(Formation of a Polymer Layer)

A fine particle dispersion was prepared by dissolving 0.1 g of the obtained $SiO_2$ layer-formed fine particles in 100 ml of pure water. To the obtained fine particle dispersion was added 0.01 g of a silane coupling agent (Tokyo Chemical Industry Co., Ltd., 3-chloropropyltriethoxysilane). The mixture was stirred for one hour, thereby producing fine particles each having a chlorine-introduced surface. The fine particles each having a chlorine-introduced surface were recovered using a centrifugation device. The recovered fine particles were re-dispersed in 10 ml of pure water, and 0.3 mmol of dimethylaminoethyl methacrylate (DMAEMA), 0.015 mmol of copper chloride, 0.015 mmol of tris[2-(dimethylamino)ethyl]amine ($ME_6TREN$), and 0.0012 mmol of ascorbic acid were added thereto. The mixture was stirred in nitrogen atmosphere for six hours, thereby producing fine particles each having a DMAEMA polymer brush bonded thereto. Then, 0.15 mmol of chlorauric acid was added thereto, and the mixture was stirred for 24 hours. Washing treatment was repeated several times in which the fine particles were recovered using a centrifugation device, re-dispersed in ethanol, and recovered again using a centrifugation device. Lanthanoid-containing inorganic material fine particles each having, as a polymer layer, a polymer brush layer containing gold particles were produced.

EXAMPLE 5

(Preparation of Lanthanoid-Containing Inorganic Material Fine Particles)
(Preparation of Core Particles)

A metal ion-containing solution B-1 was prepared by dissolving 0.40 g of yttrium acetate, 0.13 g of ytterbium acetate, and 0.013 g of erbium acetate in a solvent mixture containing 11.13 g of oleic acid, 10.39 g of trioctyl phosphine, and 46.03 g of octadecene. A solution obtained by dissolving 0.15 g of sodium hydroxide and 0.39 g of ammonium fluoride in 15 g of methanol was added right after the preparation thereof to the metal ion-containing solution B-1, thereby preparing a reaction precursor solution B-1.

The reaction precursor solution B-1 was heated with stirring in vacuum at 50° C. for 15 minutes so that methanol was vaporized to be removed from the solution. Then, the resulting solution was further heated with stirring in nitrogen atmosphere at 315° C. for 60 minutes so that fine particles were precipitated in the solution.

The solution was cooled to room temperature and 25 g of ethanol was added thereto so that the fine particles were settled. The fine particles were recovered using a centrifugation device. Washing treatment was repeated several times in which the recovered fine particles were re-dispersed in 25 g of toluene, 25 g of ethanol was again added thereto for re-aggregation of the fine particles, and the re-aggregated fine particles were recovered using a centrifugation device. Core particles were thus obtained.

(Formation of an Inner Shell)

A metal ion-containing solution B-2 was prepared by dissolving 0.41 g of yttrium acetate and 0.13 g of ytterbium acetate in a solvent mixture containing 16.69 g of oleic acid and 5.19 g of trioctyl phosphine, and 46.03 g of octadecene. A solution obtained by dissolving 0.15 g of sodium hydroxide and 0.39 g of ammonium fluoride in 15 g of methanol was added right after the preparation thereof to the metal ion-containing solution B-2, thereby preparing a reaction precursor solution B-2.

The core particles obtained in (Preparation of core particles) were added to the reaction precursor solution B-2 and dispersed therein. The resulting reaction precursor solution B-2 containing the core particles dispersed therein was heated with stirring in vacuum at 50° C. for 15 minutes so that methanol was vaporized to be removed from the solution. The resulting solution was heated with stirring in nitrogen atmosphere at 315° C. for 60 minutes so that fine particles each including a core particle and an inner shell formed on the surface of the core particle were precipitated.

The solution was cooled to room temperature, and 25 g of ethanol was added thereto so that the fine particles were settled. The fine particles were recovered using a centrifugation device. Washing treatment was repeated several times in which the recovered fine particles were re-dispersed in 25 g of toluene, 25 g of ethanol was again added thereto for re-aggregation of the fine particles, and the re-aggregated fine particles were recovered using a centrifugation device. Inner shell-formed fine particles were thus obtained.

(Formation of an Outer Shell)

A metal ion-containing solution B-3 was prepared by dissolving 0.51 g of yttrium acetate in a solvent mixture containing 16.69 g of oleic acid, 5.19 g of trioctyl phosphine, and 46.03 g of octadecene. A solution obtained by dissolving 0.15 g of sodium hydroxide and 0.39 g of ammonium fluoride in 15 g of methanol was added right after preparation thereof to the metal ion-containing solution B-3, thereby preparing a reaction precursor solution B-3.

The inner shell-formed fine particles obtained in (Formation of an inner shell) were added to the reaction precursor solution B-3 and dispersed therein. The resulting reaction precursor solution B-3 containing the inner shell-formed fine particles dispersed therein was heated with stirring in vacuum at 50° C. for 15 minutes so that methanol was vaporized to be removed from the solution. The resulting solution was heated with stirring in nitrogen atmosphere at 315° C. for 60 minutes so that fine particles each including an inner shell-formed fine particle and an outer shell formed on the surface of the inner shell-formed fine particle were precipitated.

The solution was cooled to room temperature, and 25 g of ethanol was added thereto so that the fine particles were settled. The fine particles were recovered using a centrifugation device. Washing treatment was repeated several times in which the recovered fine particles were re-dispersed in 25 g of toluene, 25 g of ethanol was again added thereto for re-aggregation of the fine particles, and the re-aggregated fine particles were recovered using a centrifugation device. Lanthanoid-containing inorganic material fine particles were thus obtained.

The washing solvent remaining in the obtained lanthanoid-containing inorganic material fine particles was removed using a vacuum dryer, and the lanthanoid-containing inorganic material fine particles were sealed in a nitrogen-atmosphere hermetic container until the evaluation was performed.

The amounts of a lanthanoid having a light-absorbing function, a lanthanoid having a light-emitting function, and an element having a similar ionic radius or a similar structure upon crystallization to that of the lanthanoids contained in the core particle, the inner shell, and the outer shell of the obtained lanthanoid-containing inorganic material fine particle were measured using a fluorescence X-ray analyzer (EDX-800HS available from Shimadzu Corporation).

In addition, the presence of $NaYF_4$ in the core particle, the inner shell, and the outer shell was confirmed based on the peak pattern using an X-ray diffractometer.

EXAMPLE 6

Lanthanoid-containing inorganic material fine particles were obtained in the same manner as in Example 5 except that 0.31 g of yttrium acetate, 0.08 g of sodium hydroxide, and 0.23 g of ammonium fluoride were used in (Formation of an outer shell) in Example 5.

EXAMPLE 7

Lanthanoid-containing inorganic material fine particles were obtained in the same manner as in Example 5 except that 6.1 g of yttrium acetate, 55 g of methanol, 1.8 g of sodium hydroxide, and 4.7 g of ammonium fluoride were used in (Formation of an outer shell) in Example 5.

EXAMPLE 8

Lanthanoid-containing inorganic material fine particles were obtained in the same manner as in Example 5 except that 0.30 g of yttrium acetate and 0.25 g of ytterbium acetate were used in (Formation of an inner shell) in Example 5.

EXAMPLE 9

Lanthanoid-containing inorganic material fine particles were obtained in the same manner as in Example 1 except that 0.20 g of yttrium acetate and 0.38 g of ytterbium acetate were used in (Formation of an inner shell) in Example 5.

EXAMPLE 10

(Formation of an Intermediate Layer)
A dispersion was prepared by dispersing 0.1 g of the lanthanoid-containing inorganic material fine particles obtained in Example 5 in 200 ml of cyclohexane. To the obtained dispersion was added a mixed liquid obtained by mixing 50 ml of cyclohexane and 25 ml of a surfactant (Igepal-520 available from Sigma-Aldrich Co. LLC.). To the mixture was further added 10 ml of 28% ammonia water. The mixture was stirred for one hour. Then, 2.5 ml of tetraethyl orthosilicate (TEOS) was added to the mixture, followed by stirring for 24 hours. Washing treatment was performed several times in which the fine particles were recovered using a centrifugation device, re-dispersed in ethanol, and then recovered again using a centrifugation device. Thus, $SiO_2$ layer-formed fine particles each including a $SiO_2$ layer on the surface as an intermediate layer were produced.
(Formation of a Polymer Layer)
A fine particle dispersion was prepared by dispersing 0.1 g of the obtained $SiO_2$ layer-formed fine particles in 100 ml of pure water. To the obtained fine particle dispersion was added 0.01 g of a silane coupling agent (Tokyo Chemical Industry Co., Ltd., 3-chloropropyltriethoxysilane). The mixture was stirred for one hour, thereby producing fine particles each having a chlorine-introduced surface. The fine particles each having a chlorine-introduced surface were recovered using a centrifugation device. The recovered fine particles were re-dispersed in 10 ml of pure water, and 0.3 mmol of dimethylaminoethyl methacrylate (DMAEMA), 0.015 mmol of copper chloride, 0.015 mmol of tris[2-(dimethylamino)ethyl]amine ($ME_6TREN$), and 0.0012 mmol of ascorbic acid were added thereto. The mixture was stirred in nitrogen atmosphere for six hours, thereby producing fine particles each having a DMAEMA polymer brush bonded thereto. Then, 0.015 mmol of chlorauric acid was added thereto, and the mixture was stirred for 24 hours. The fine particles were recovered using a centrifugation device. Washing treatment was repeated several times in which the fine particles were recovered using a centrifugation device, re-dispersed in ethanol, and recovered again using a centrifugation device. Lanthanoid-containing inorganic material fine particles each having, as a polymer layer, a polymer brush layer containing gold particles were obtained.

COMPARATIVE EXAMPLE 1

Lanthanoid-containing inorganic material fine particles were obtained in the same manner as in Example 1 except that the process of (Formation of a shell layer (outer shell)) in Example 1 was not performed.

The washing solvent remaining in the obtained lanthanoid-containing inorganic material fine particles was removed using a vacuum dryer, and the lanthanoid-containing inorganic material fine particles were sealed in a nitrogen-atmosphere hermetic container until the evaluation was performed.

COMPARATIVE EXAMPLE 2

Lanthanoid-containing inorganic material fine particles were obtained in the same manner as in Example 1 except that a solvent mixture containing 11.13 g of oleic acid and 46.03 g of octadecene was used in (Preparation of core particles) and (Formation of a shell layer (outer shell)) in Example 1.

COMPARATIVE EXAMPLE 3

Lanthanoid-containing inorganic material fine particles were obtained in the same manner as in Example 1 except that a solvent mixture containing 20.78 g of trioctyl phosphine and 46.03 g of octadecene was used in (Preparation of core particles) and (Formation of a shell layer (outer shell)) in Example 1.

COMPARATIVE EXAMPLE 4

Lanthanoid-containing inorganic material fine particles were obtained in the same manner as in Example 1 except that 0.15 g of yttrium acetate, 0.045 g of sodium hydroxide, and 0.13 g of ammonium fluoride were used in (Formation of a shell layer (outer shell)) in Example 1.

COMPARATIVE EXAMPLE 5

Lanthanoid-containing inorganic material fine particles were obtained in the same manner as in Example 1 except that 7.65 g of yttrium acetate, 60 g of methanol, 2.25 g of sodium hydroxide, and 5.85 g of ammonium fluoride were used in (Formation of a shell layer (outer shell)) in Example 1.

COMPARATIVE EXAMPLE 6

Lanthanoid-containing inorganic material fine particles were obtained in the same manner as in Example 1 except that 0.013 g of ytterbium acetate and 0.0013 g of erbium acetate were used in addition to 0.49 g of yttrium acetate in (Formation of a shell layer (outer shell)) in Example 1.

COMPARATIVE EXAMPLE 7

Lanthanoid-containing inorganic material fine particles were obtained in the same manner as in Example 5 except that a solvent mixture containing 11.13 g of oleic acid and 46.03 g of octadecene was used in (Preparation of core particles), (Formation of an inner shell), and (Formation of an outer shell) in Example 5.

COMPARATIVE EXAMPLE 8

Lanthanoid-containing inorganic material fine particles were obtained in the same manner as in Example 5 except that a solvent mixture containing 20.78 g of trioctyl phosphine and 46.03 g of octadecene was used in (Preparation of core particles), (Formation of an inner shell), and (Formation of an outer shell) in Example 5.

COMPARATIVE EXAMPLE 9

Lanthanoid-containing inorganic material fine particles were obtained in the same manner as in Example 5 except that 0.18 g of yttrium acetate, 0.054 g of sodium hydroxide, and 0.16 g of ammonium fluoride were used in (Formation of an outer shell) in Example 5.

COMPARATIVE EXAMPLE 10

Lanthanoid-containing inorganic material fine particles were obtained in the same manner as in Example 5, except that 9.18 g of yttrium acetate, 75 g of methanol, 2.70 g of sodium hydroxide, and 7.02 g of ammonium fluoride were used in (Formation of an outer shell) in Example 5.

COMPARATIVE EXAMPLE 11

Lanthanoid-containing inorganic material fine particles were obtained in the same manner as in Example 5 except that 0.013 g of ytterbium acetate and 0.0013 g of erbium acetate were used in addition to 0.49 g of yttrium acetate in (Formation of an outer shell) in Example 5.

COMPARATIVE EXAMPLE 12

Lanthanoid-containing inorganic material fine particles having an average particle size of 64.7 nm were obtained by pulverizing a lanthanoid-containing inorganic crystal (Sigma-Aldrich Co. LLC., Er- and Yb-doped $NaYF_4$ (Er content: 2 mol %, Yb content: 20 mol %) using a bead mill.
(Evaluation)

The lanthanoid-containing inorganic material fine particles obtained in the examples and comparative examples were evaluated as follows. Tables 1 and 2 show the results.
(1) Measurement of the Average Particle Size of Core Particles and Thickness of the Inner Shell, Outer Shell, Intermediate Layer, and Polymer Layer The core particles, inner shell-formed fine particles, and lanthanoid-containing inorganic material fine particles obtained in each of the examples and comparative examples were observed using a transmission electron microscope. The average of the particle sizes of 300 particles in the obtained image was calculated to determine the average particle size of each particle type. In Examples 1 to 4 and Comparative Examples 2 to 6, the difference in the average particle size between the core particles before formation of the shell layer (outer shell) and the lanthanoid-containing inorganic material fine particles after formation of the shell layer was obtained, thereby determining the thickness of the shell layer (outer shell). In Examples 5 to 10 and Comparative Examples 7 to 11, the difference in the average particle size between the fine particles before formation of each shell and the fine particles after formation of each shell was obtained, thereby determining the thicknesses of the inner shell and the outer shell. In Examples 4 and 10, the average particle size of the fine particles each having an intermediate layer formed thereon and the average particle size of the lanthanoid-containing inorganic material fine particles each further having a polymer layer formed thereon were measured. The differences between the obtained average particle sizes and the average particle size of the lanthanoid-containing inorganic material fine particle obtained in Example 1 or 5 were calculated, thereby determining the thicknesses of the intermediate layer and the polymer layer.

Figure 2:
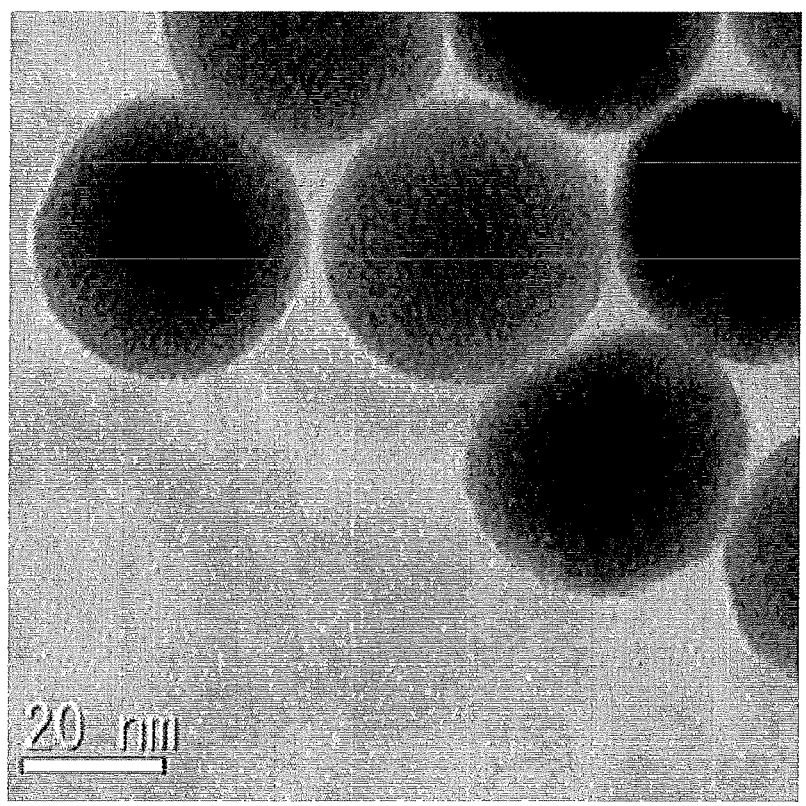
FIG. 2 is an electron microscopic photograph of lanthanoid-containing inorganic material fine particles obtained in Example 1.
Figure 3:
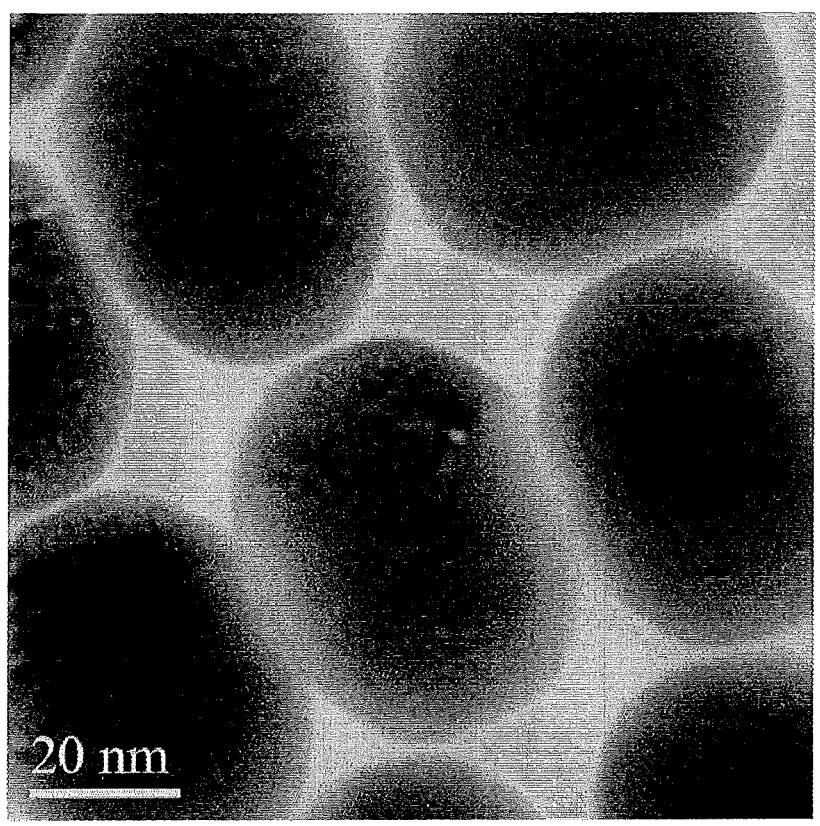
FIG. 3 is an electron microscopic photograph of lanthanoid-containing inorganic material fine particles obtained in Example 5.

FIGS. 1 and 2 respectively show electron microscopic photographs of the core particles and the lanthanoid-containing inorganic material fine particles obtained in Example 1. FIG. 3 shows an electron microscopic photograph of the lanthanoid-containing inorganic material fine particle obtained in Example 5.
(2) Measurement of the Amount and Average Particle Size of Noble Metal Particles The lanthanoid-containing inorganic material fine particles obtained in Examples 4 and 10 were observed using a transmission electron microscope. Based on the difference in contrast between the polymer layer and noble metal particles contained in the polymer layer in the obtained image, the volume of the polymer layer and the volume of the noble metal particles were calculated by binarization by image analysis. The amount of the noble metal particles in the polymer layer was thus determined.

In addition, the average of particle sizes of 300 noble metal particles was calculated, thereby determining the average particle size of the noble metal particles contained in the polymer layer.
(3) Check on Contact Face (Check on Crystal Structure)

The crystal structures of the core particles and the lanthanoid-containing inorganic material fine particles obtained in Examples 1 to 4 and Comparative Examples 2 to 6 were analyzed using an X-ray diffractometer and the peaks obtained before and after the formation of a shell layer (outer shell) were checked to evaluate the continuousness of the crystal structures of the core particle and the shell layer.

The crystal structures of the core particles, the inner shell-formed fine particles, and the lanthanoid-containing inorganic material fine particles obtained in Examples 5 to 10 and Comparative Examples 7 to 11 were analyzed using an X-ray diffractometer and the peaks obtained before and after the formation of a shell layer were checked to evaluate the continuousness of the crystal structures of the core particle and the inner shell and the continuousness of the crystal structures of the inner shell and the outer shell.

The case where the peaks observed were the same was rated "○ (Good)" and the case where the peaks observed were different from each other was rated "× (Poor)". In the case where the same peaks were observed, the shell layer was considered to be continuously formed. In the case where the peak(s) observed after the formation of the shell layer was(were) different that(those) before the formation of the shell layer, crystals were considered to have grown discontinuously at each contact face to form an interface.

Figure 4:
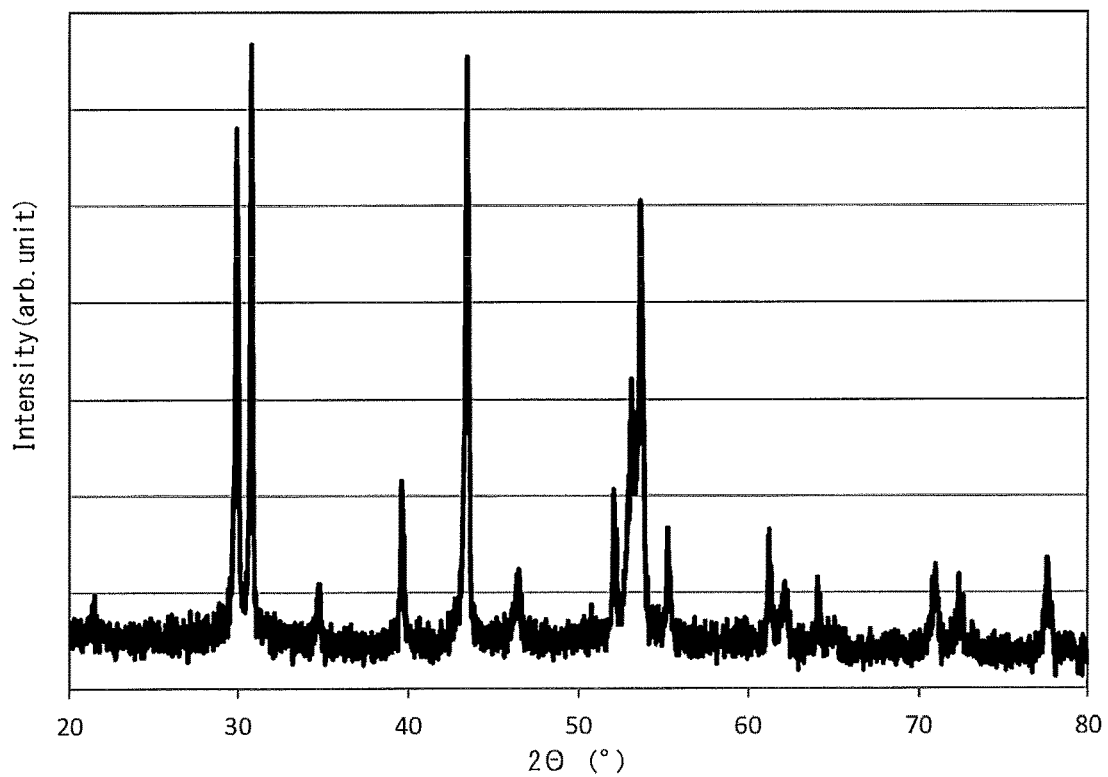
FIG. 4 is a graph showing a crystal structure spectrum obtained by X-ray diffraction analysis of core particles obtained in Example 1 in determination of the core-shell structure.
Figure 5:
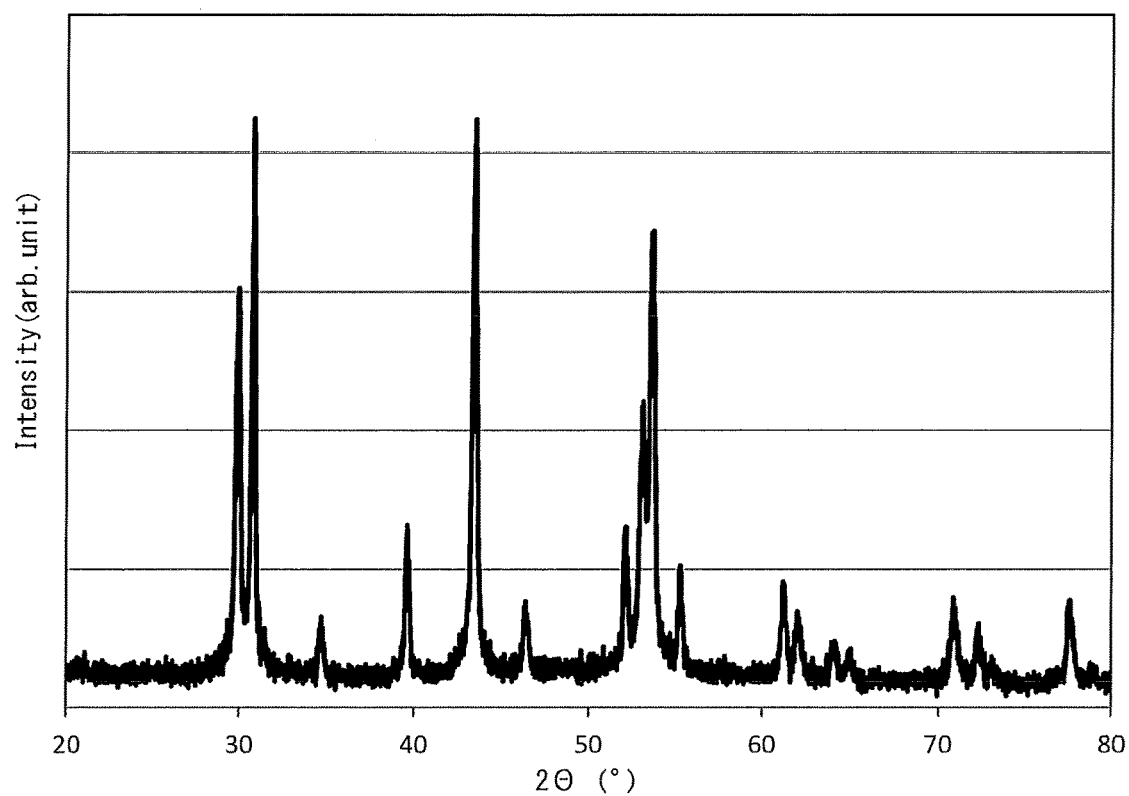
FIG. 5 is a graph showing a crystal structure spectrum obtained by X-ray diffraction analysis of lanthanoid-containing inorganic material fine particles obtained in Example 1 in determination of the core-shell structure.
Figure 6:
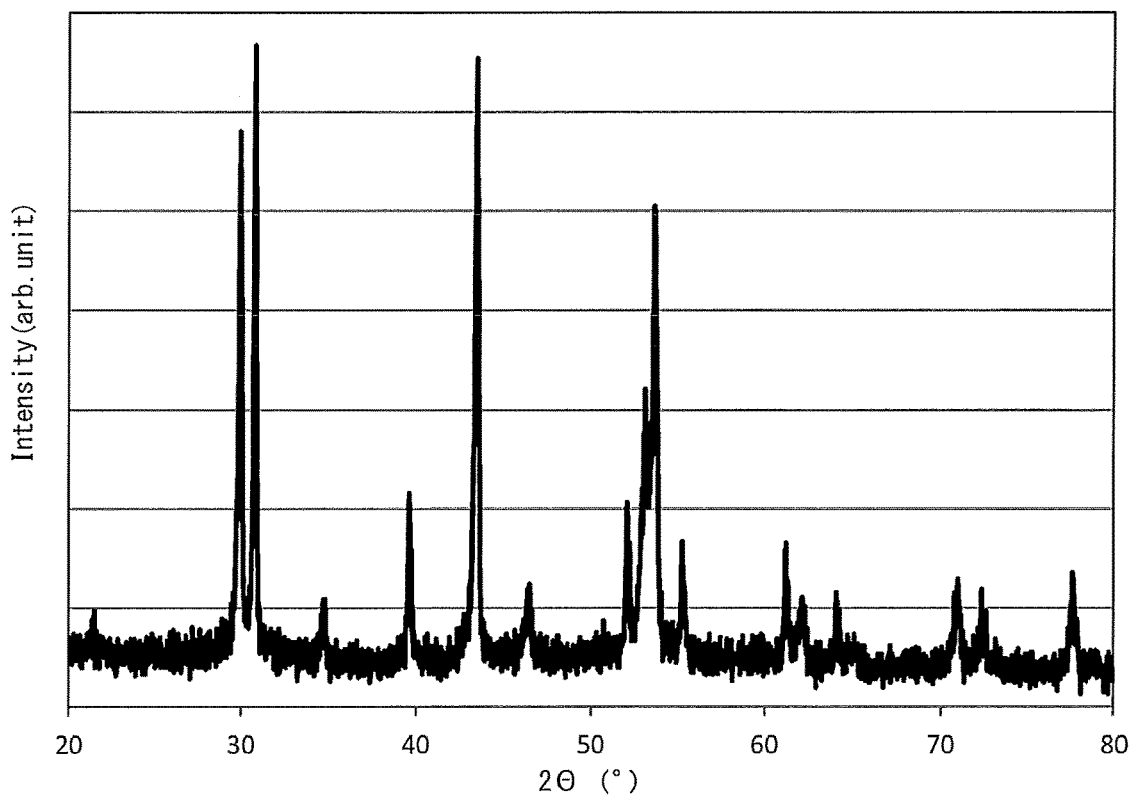
FIG. 6 is a graph showing a crystal structure spectrum obtained by X-ray diffraction analysis of core particles obtained in Comparative Example 2 in determination of the core-shell structure.
Figure 7:
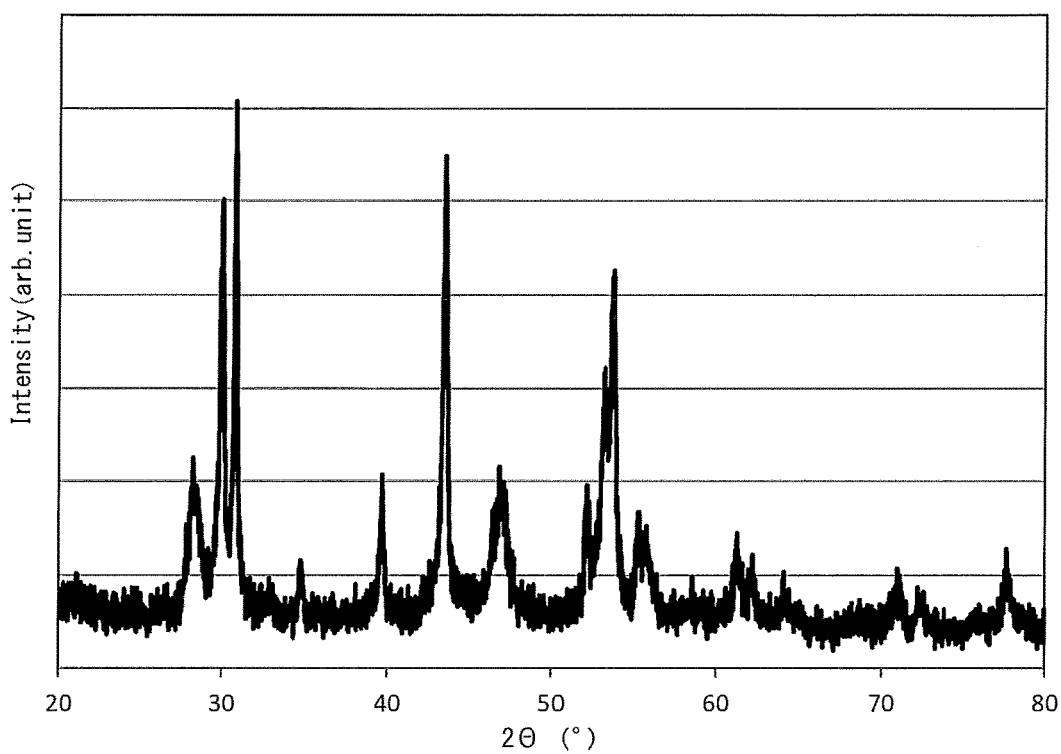
FIG. 7 is a graph showing a crystal structure spectrum obtained by X-ray diffraction analysis of lanthanoid-containing inorganic material fine particles obtained in Comparative Example 2 in determination of the core-shell structure.

FIGS. 4 and 5 show graphs showing crystal structure spectra obtained by X-ray diffraction analysis of the core particles and the lanthanoid-containing inorganic material fine particles obtained in Example 1. FIGS. 6 and 7 show graphs showing crystal structure spectra obtained by X-ray diffraction analysis of the core particles and the lanthanoid-containing inorganic material fine particles obtained in Comparative Example 2.
(4) Confirmation of the Presence or Absence of Contamination in the Shell Layer (Oxygen Relative Increase Rate)

Dispersions were prepared by individually dispersing the lanthanoid-containing inorganic material fine particles obtained in Examples 1 to 4 and Comparative Examples 2 to 6 in toluene. Each dispersion was applied to the surface of a silicon wafer to form a single particle layer having a close-packed structure of the lanthanoid-containing inorganic material fine particles. The surface of the obtained single particle layer was subjected to irradiation using an Ar-sputter gun so that the lanthanoid-containing inorganic material fine particles were cut at a rate of 5 nm per minute. The elemental contents (carbon, oxygen, yttrium) in the cutting direction were analyzed using an Auger electron spectrometer. In the case where the relative proportion of an increase in the detected amount of the oxygen element after the cutting to the depth corresponding to the thickness of the shell layer (outer shell) was 25% or more relative to the detected amount in a part corresponding to the shell layer (outer shell), formation of an interface due to oxidation at the contact face between the core particle and the shell layer (outer shell) was confirmed.

Dispersions were prepared by individually dispersing the lanthanoid-containing inorganic material fine particles obtained in Examples 5 to 10 and Comparative Examples 7 to 11 in toluene. Each dispersion was applied to the surface of a silicon wafer to form a single particle layer having a close-packed structure of the lanthanoid-containing inorganic material fine particles. The surface of the obtained single particle layer was subjected to irradiation using an Ar-sputter gun so that the lanthanoid-containing inorganic material fine particles were cut at a rate of 5 nm per minute. The elemental contents (carbon, oxygen, yttrium) in the cutting direction were analyzed using an Auger electron spectrometer. In the case where the relative proportion of an increase in the detected amount of the oxygen element after the cutting to the depth corresponding to the thickness of the outer shell was 25% or more relative to the detected amount in a part corresponding to the outer shell, formation of an interface due to oxidation at the contact face between the outer shell and the inner shell was confirmed. In the case where an interface due to oxidation at the contact face between the outer shell and the inner shell is formed, an interface due to oxidation is presumably also formed at the contact face between the core particle and the inner shell.

(5) Measurement of Emission Intensity

The lanthanoid-containing inorganic material fine particles obtained in each example and comparative example were irradiated with infrared rays using an infrared generator (L980P300J available from THORLABS) set at a wavelength of 980 nm and an output of 300 mW as an external light source. The obtained fluorescence emission spectrum was analyzed using a fluorescence spectrophotometer (U-2700 available from Hitachi High-Technologies Corporation). The emission intensity was evaluated by calculating the relative value of the maximum strength in the fluorescence emission spectrum of each example and comparative example with the maximum strength in the spectrum in Comparative Example 1 set to 1.

Figure 8:
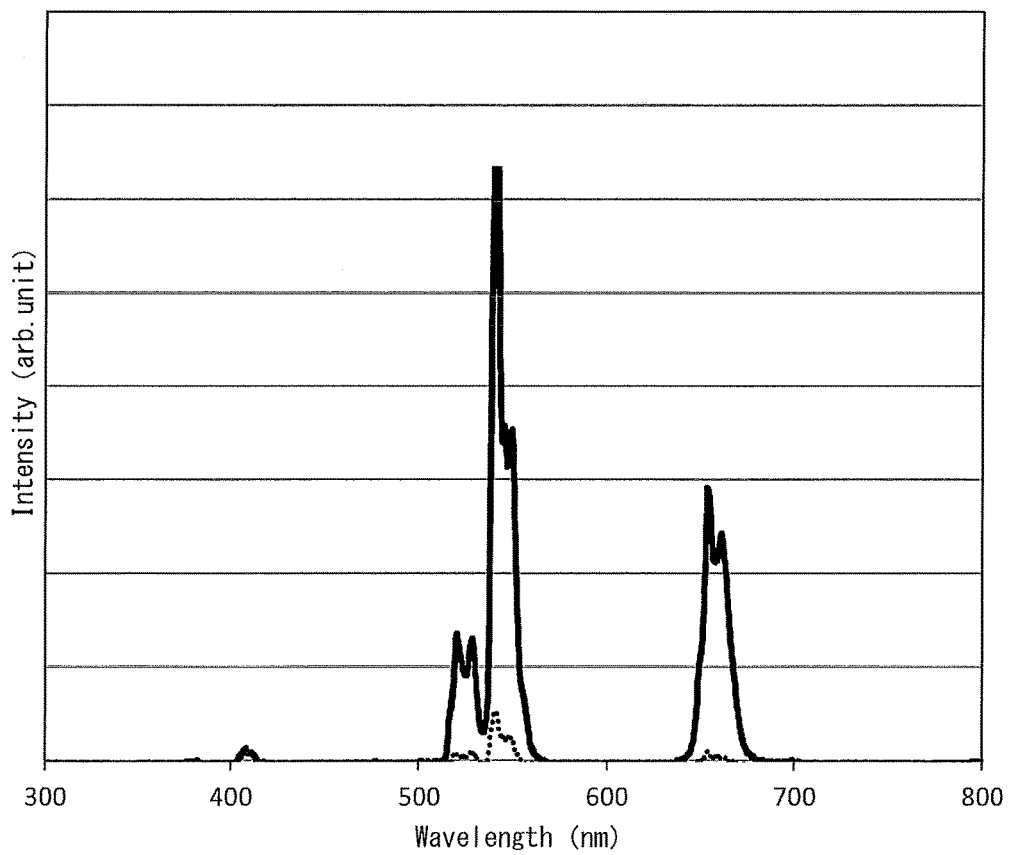
FIG. 8 is a graph showing fluorescence emission peaks to incident light at 980 nm of lanthanoid-containing inorganic material fine particles obtained in Example 1 (solid line) and Comparative Example 1 (dotted line) in measurement of the emission intensity.

FIG. 8 shows a graph showing the fluorescence emission peaks to the incident light at 980 nm of the lanthanoid-containing inorganic material fine particles obtained in Example 1 and Comparative Example 1.

(6) Humidity Resistance of the Lanthanoid-Containing Inorganic Material Fine Particles (Retention Rate of Emission Intensity After High-Temperature, High-Humidity Test)

The lanthanoid-containing inorganic material fine particles obtained in each of the examples and comparative examples were left in a high-temperature, high-humidity tester (85° C., 85% RH) for 500 hours. The emission intensity of the lanthanoid-containing inorganic material fine particles after the high-temperature, high-humidity test was measured in the same manner as in (5) Measurement of emission intensity. The humidity resistance was evaluated by calculating the retention rate of the emission intensity after the high-temperature, high-humidity test with the emission intensity before the high-temperature, high-humidity test set to 100%.

(7) Water Resistance of Wavelength Conversion Ink (Line Width Increase Rate)

A wavelength conversion ink was prepared by mixing 0.1 g of the lanthanoid-containing inorganic material fine particles obtained in each of the examples and comparative examples and 9.9 g of cyclohexane. A bar-code pattern (line width: 100 μm, line interval: 100 μm) was printed on copy paper (10 cm×10 cm) with the obtained wavelength conversion ink using an inkjet printer (NanoPrinter 3000 available from Microjet Corporation). The copy paper with a pattern printed with the wavelength conversion ink was sunk in a container sufficiently filled with water (water depth: 10 cm) at a rate of 1 cm per second. One minute later, the copy paper was lifted out of the container at a lifting rate of 1 cm per second. The line widths (width of ink bleeding) before and after the immersion were measured by observation using a microscope under irradiation with infrared rays. The water resistance of the printing pattern was evaluated by calculating the increase rate of the line width after the immersion with the line width before the immersion set to 100%.

TABLE 1

| | Lanthanoid-containing inorganic material particle *1 | | | | | | | | | | |
|---|---|---|---|---|---|---|---|---|---|---|---|
| | Core particle | | | Shell layer | | | | | | Intermediate layer | |
| | | | | Inner shell | | | Outer shell | | | | |
| | Amount of lanthanoid having light-absorbing function (mol %) | Amount of lanthanoid having light-emitting function (mol %) | Average particle size (nm) | Amount of lanthanoid having light-absorbing function (mol %) | Amount of lanthanoid having light-emitting function (mol %) | Thickness (nm) | Amount of lanthanoid having light-absorbing function (mol %) | Amount of lanthanoid having light-emitting function (mol %) | Thickness (nm) | Structure | Thickness (nm) |
| Example 1 | 20.3 | 1.96 | 27.3 | — | — | — | 0.0 | 0.0 | 5.5 | — | — |
| Example 2 | 20.3 | 1.96 | 27.3 | — | — | — | 0.0 | 0.0 | 2.6 | — | — |
| Example 3 | 20.3 | 1.96 | 27.3 | — | — | — | 0.0 | 0.0 | 18.2 | — | — |
| Example 4 | 20.3 | 1.96 | 27.3 | — | — | — | 0.0 | 0.0 | 5.5 | SiO$_2$ | 1.7 |
| Example 5 | 20.3 | 1.96 | 27.3 | 19.4 | 0.0 | 5.4 | 0.0 | 0.0 | 5.0 | — | — |
| Example 6 | 20.3 | 1.96 | 27.3 | 19.4 | 0.0 | 5.4 | 0.0 | 0.0 | 2.1 | — | — |
| Example 7 | 20.3 | 1.96 | 27.3 | 19.4 | 0.0 | 5.4 | 0.0 | 0.0 | 17.5 | — | — |
| Example 8 | 20.3 | 1.96 | 27.3 | 41.7 | 0.0 | 5.1 | 0.0 | 0.0 | 5.0 | — | — |
| Example 9 | 20.3 | 1.96 | 27.3 | 58.7 | 0.0 | 4.8 | 0.0 | 0.0 | 5.4 | — | — |
| Example 10 | 20.3 | 1.96 | 27.3 | 19.4 | 0.0 | 5.4 | 0.0 | 0.0 | 5.0 | SiO$_2$ | 1.3 |

TABLE 1-continued

| | Lanthanoid-containing inorganic material particle *1 | | | | | | | | |
|---|---|---|---|---|---|---|---|---|---|
| | Polymer layer | | | | | Evaluation | | | |
| | | Noble metal particles | | | | | | | |
| | Polymer | Noble metal | Amount (vol %) | Average particle size (nm) | Thickness (nm) | Check on contact face | Oxygen relative increase rate by elemental analysis (%) | Emission intensity *2 | Emission intensity retention rate after high-temperature, high-humidity test (%) | Linewidth increase rate (%) |
| Example 1 | — | — | — | — | — | ○ | 8.2 | 13.4 | 91.6 | 105.3 |
| Example 2 | — | — | — | — | — | ○ | 7.0 | 10.4 | 90.8 | 104.9 |
| Example 3 | — | — | — | — | — | ○ | 10.1 | 11.7 | 92.9 | 108.3 |
| Example 4 | DMAEMA polymer | Gold | 25.9 | 7.5 | 28.4 | ○ | 8.2 | 39.7 | 90.1 | 107.4 |
| Example 5 | — | — | — | — | — | ○ | 10.8 | 16.9 | 92.4 | 105.9 |
| Example 6 | — | — | — | — | — | ○ | 9.4 | 12.6 | 94.0 | 104.7 |
| Example 7 | — | — | — | — | — | ○ | 13.4 | 12.9 | 95.6 | 109.3 |
| Example 8 | — | — | — | — | — | ○ | 17.0 | 16.7 | 93.1 | 103.5 |
| Example 9 | — | — | — | — | — | ○ | 15.7 | 10.9 | 92.1 | 106.8 |
| Example 10 | DMAEMA polymer | Gold | 21.8 | 6.8 | 24.9 | ○ | 10.8 | 50.4 | 91.1 | 108.4 |

*1 The amounts of a lanthanoid having a light-absorbing function and a lanthanoid having a light-emitting function each represent a proportion relative to the amount of rare-earth elements contained in the core particle, inner shell, or outer shell.
*2 Relative value with the maximum strength of Comparative Example 1 set to 1

TABLE 2

| | Lanthanoid-containing inorganic material particle *1 | | | | | | | | | | |
|---|---|---|---|---|---|---|---|---|---|---|---|
| | Core particle | | | Shell layer | | | | | | | |
| | | | | Inner shell | | | Outer shell | | | Intermediate layer | |
| | Amount of lanthanoid having light-absorbing function (mol %) | Amount of lanthanoid having light-emitting function (mol %) | Average particle size (nm) | Amount of lanthanoid having light-absorbing function (mol %) | Amount of lanthanoid having light-emitting function (mol %) | Thickness (nm) | Amount of lanthanoid having light-absorbing function (mol %) | Amount of lanthanoid having light-emitting function (mol %) | Thickness (nm) | Structure | Thickness (nm) |
| Comparative Example 1 | 20.3 | 1.96 | 27.3 | — | — | — | — | — | — | — | — |
| Comparative Example 2 | 19.5 | 2.01 | 30.1 | — | — | — | 0.0 | 0.0 | 5.2 | — | — |
| Comparative Example 3 | 19.9 | 1.9 | 29.4 | — | — | — | 0.0 | 0.0 | 4.8 | — | — |
| Comparative Example 4 | 20.3 | 1.96 | 27.3 | — | — | — | 0.0 | 0.0 | 1.5 | — | — |
| Comparative Example 5 | 20.3 | 1.96 | 27.3 | — | — | — | 0.0 | 0.0 | 21.0 | — | — |
| Comparative Example 6 | 20.3 | 1.96 | 27.3 | — | — | — | 2.1 | 0.3 | 4.9 | — | — |
| Comparative Example 7 | 19.5 | 2.01 | 30.1 | 19.4 | 0.0 | 5.0 | 0.0 | 0.0 | 5.5 | — | — |
| Comparative Example 8 | 19.9 | 1.9 | 29.4 | 19.4 | 0.0 | 4.5 | 0.0 | 0.0 | 5.6 | — | — |
| Comparative Example 9 | 20.3 | 1.96 | 27.3 | 19.4 | 0.0 | 5.4 | 0.0 | 0.0 | 1.2 | — | — |
| Comparative Example 10 | 20.3 | 1.96 | 27.3 | 19.4 | 0.0 | 5.4 | 0.0 | 0.0 | 20.3 | — | — |
| Comparative Example 11 | 20.3 | 1.96 | 27.3 | 19.4 | 0.0 | 5.4 | 1.9 | 0.2 | 5.6 | — | — |
| Comparative Example 12 | 20 | 2.0 | 64.7 | — | — | — | — | — | — | — | — |

TABLE 2-continued

| | Lanthanoid-containing inorganic material particle *1 Polymer layer | | | | | Evaluation | | | | |
|---|---|---|---|---|---|---|---|---|---|---|
| | | Noble metal particles | | | | | | | | |
| | Polymer | Noble metal | Amount (vol %) | Average particle size (nm) | Thickness (nm) | Check on contact face | Oxygen relative increase rate by elemental analysis (%) | Emission intensity *2 | Emission intensity retention rate after high-temperature, high-humidity test (%) | Line-width increase rate (%) |
| Comparative Example 1 | — | — | — | — | — | — | — | 1.0 | 87.9 | 103.7 |
| Comparative Example 2 | — | — | — | — | — | x | 29.4 | 7.0 | 65.9 | 117.4 |
| Comparative Example 3 | — | — | — | — | — | x | 34.7 | 5.0 | 61.1 | 119.7 |
| Comparative Example 4 | — | — | — | — | — | ○ | 11.0 | 7.9 | 91.6 | 104.4 |
| Comparative Example 5 | — | — | — | — | — | ○ | 9.2 | 9.7 | 94.3 | 107.4 |
| Comparative Example 6 | — | — | — | — | — | ○ | 12.4 | 8.0 | 93.0 | 105.5 |
| Comparative Example 7 | — | — | — | — | — | x | 32.9 | 8.9 | 66.6 | 124.7 |
| Comparative Example 8 | — | — | — | — | — | x | 40.0 | 5.4 | 59.9 | 121.9 |
| Comparative Example 9 | — | — | — | — | — | ○ | 16.0 | 7.9 | 90.9 | 102.9 |
| Comparative Example 10 | — | — | — | — | — | ○ | 14.5 | 9.9 | 94.7 | 110.7 |
| Comparative Example 11 | — | — | — | — | — | ○ | 16.3 | 8.2 | 90.7 | 107.1 |
| Comparative Example 12 | — | — | — | — | — | — | — | 4.8 | 54.7 | 138.2 |

*1 The amounts of a lanthanoid having a light-absorbing function and a lanthanoid having a light-emitting function each represent a proportion relative to the amount of rare-earth elements contained in the core particle, inner shell, or outer shell.
*2 Relative value with the maximum strength of Comparative Example 1 set to 1

INDUSTRIAL APPLICABILITY

The present invention can provide a lanthanoid-containing inorganic material fine particle that enables achievement of high luminous efficiency with less energy outflow upon conversion of the wavelength of light to a shorter wavelength. The present invention can also provide a wavelength conversion ink capable of maintaining a high emission intensity at the time of wavelength conversion for a long period of time, having high water repellency, and capable of forming a printing pattern excellent in retention properties, a coated article produced using the wavelength conversion ink, and a determination apparatus.

The invention claimed is:

1. A lanthanoid-containing inorganic material fine particle having a function of converting a wavelength of light to a shorter wavelength, the lanthanoid-containing inorganic material fine particle comprising:
  a core particle; and
  a shell layer,
  the core particle containing a lanthanoid having a light-absorbing function and a lanthanoid having a light-emitting function,
  the shell layer comprising at least an outer shell containing a rare earth element,
  a total amount of the lanthanoid having a light-absorbing function and the lanthanoid having a light-emitting function in the outer shell being 2 mol % or less based on an amount of the rare earth element contained in the outer shell,
  the outer shell having a thickness of 2 to 20 nm,
  the core particle and the shell layer having no interface at a contact face to form a continuous body, and
  the lanthanoid-containing inorganic material fine particle further having a fatty acid and an organophosphorus compound on a surface of the shell layer.

2. The lanthanoid-containing inorganic material fine particle according to claim 1,
  wherein the shell layer further comprises an inner shell containing a rare earth element,
  an amount of the lanthanoid having a light-absorbing function in the inner shell is 75 mol % or less and an amount of the lanthanoid having a light-emitting function in the inner shell is 2 mol % or less, based on an amount of the rare earth element contained in the inner shell, and
  the inner shell and the outer shell have no interface at a contact face to form a continuous body.

3. The lanthanoid-containing inorganic material fine particle according to claim 2,
  wherein the inner shell has a thickness of 2 to 20 nm.

4. The lanthanoid-containing inorganic material fine particle according to claim 1,
  wherein the core particle has an average particle size of 5 to 250 nm.

5. The lanthanoid-containing inorganic material fine particle according to claim 1, containing:
  a fluoride containing an alkali metal and a rare earth element; or
  a fluoride containing oxygen, an alkali metal and a rare earth element.

6. The lanthanoid-containing inorganic material fine particle according to claim 1, further comprising a polymer layer containing a polymer and noble metal particles around the shell layer.

7. The lanthanoid-containing inorganic material fine particle according to claim 6, wherein the polymer layer is a polymer brush layer.

8. The lanthanoid-containing inorganic material fine particle according to claim 6, further comprising
an intermediate layer between the shell layer and the polymer layer.

9. An wavelength conversion ink comprising:
the lanthanoid-containing inorganic material fine particle according to claim 1; and
a solvent.

10. The wavelength conversion ink according to claim 9, which is a security ink.

11. A coated article comprising:
the wavelength conversion ink according to claim 9; and
a substrate.

12. A lanthanoid-containing inorganic material fine particle having a function of converting a wavelength of light to a shorter wavelength, the lanthanoid-containing inorganic material fine particle comprising:
a core particle; and
a shell layer,
the core particle containing a lanthanoid having a light-absorbing function and a lanthanoid having a light-emitting function,
the shell layer comprising at least an outer shell containing a rare earth element,
a total amount of the lanthanoid having a light-absorbing function and the lanthanoid having a light-emitting function in the outer shell being 2 mol % or less based on an amount of the rare earth element contained in the outer shell,
the outer shell having a thickness of 2 to 20 nm,
the core particle and the shell layer having no interface at a contact face to form a continuous body, and
the lanthanoid-containing inorganic material fine particle further comprising a polymer layer containing a polymer and noble metal particles around the shell layer.

13. A method for determining authenticity of information printed on a substrate with the wavelength conversion ink according to claim 9 by evaluating an emission spectrum and a printing pattern of the wavelength conversion ink, comprising:
irradiating using an irradiation means for infrared irradiation of a coated article comprising the wavelength conversion ink and the substrate, and
detecting using a detection means for detecting an emission spectrum generated by the infrared irradiation and a printing pattern of the wavelength conversion ink.

* * * * *